United States Patent
Sawai et al.

(10) Patent No.: US 8,927,629 B2
(45) Date of Patent: Jan. 6, 2015

(54) RESIN COMPOSITION AND MOLDED ARTICLE

(71) Applicant: FUJIFILM Corporation, Minato-ku, Tokyo (JP)

(72) Inventors: Daisuke Sawai, Ashigarakami-gun (JP); Takayasu Nagai, Ashigarakami-gun (JP); Hiroshi Inada, Ashigarakami-gun (JP); Akio Tamura, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 14/072,360

(22) Filed: Nov. 5, 2013

(65) Prior Publication Data

US 2014/0058022 A1  Feb. 27, 2014

Related U.S. Application Data

(63) Continuation of application No. PCT/JP2012/062283, filed on May 14, 2012.

(30) Foreign Application Priority Data

May 17, 2011 (JP) .................... 2011-110099

(51) Int. Cl.
| | |
|---|---|
| *C08L 1/32* | (2006.01) |
| *C08L 69/00* | (2006.01) |
| *C08K 5/00* | (2006.01) |
| *C08K 5/105* | (2006.01) |
| *C08K 5/527* | (2006.01) |

(52) U.S. Cl.
CPC . *C08L 1/32* (2013.01); *C08L 69/00* (2013.01); *C08K 5/005* (2013.01); *C08K 5/105* (2013.01); *C08K 5/527* (2013.01)
USPC ........................................ 524/35

(58) Field of Classification Search
CPC ........................................ C08L 1/32
USPC ........................... 524/35, 120, 291
See application file for complete search history.

(56) References Cited

U.S. PATENT DOCUMENTS

| | | |
|---|---|---|
| 2002/0102369 A1 | 8/2002 | Shimizu et al. |
| 2011/0098463 A1* | 4/2011 | Yoshitani et al. ............... 536/32 |

FOREIGN PATENT DOCUMENTS

| | | | |
|---|---|---|---|
| CN | 101328237 A | * | 12/2008 |
| JP | 2000-007829 A | | 1/2000 |
| JP | 2002-020410 A | | 1/2002 |
| JP | 2006-111858 A | | 4/2006 |
| JP | 2006-249221 A | | 9/2006 |
| JP | 2006-328298 A | | 12/2006 |
| JP | 2007-161943 A | | 6/2007 |
| JP | 2010-241848 A | | 10/2010 |
| WO | 2011/019064 A1 | | 2/2011 |

OTHER PUBLICATIONS

English Translation of CN101328237A. Obtained Apr. 14, 2014 at http://worldwide.espacenet.com/publicationDetails/biblio?DB=EPODOC&II=0&ND=3&adjacent=true&locale=en_EP&FT=D&date=20081224&CC=CN&NR=101328237A&KC=A.*
International Search Report for PCT/JP2012/062283 dated Jun. 26, 2012.

* cited by examiner

*Primary Examiner* — Ling Choi
*Assistant Examiner* — Lanee Reuther
(74) *Attorney, Agent, or Firm* — Sughrue Mion, PLLC

(57) ABSTRACT

A cellulose acetate resin composition having a cellulose acetate ether compound and a stabilizer;
   the cellulose acetate ether compound comprising a specific atomic group, the specific atomic group being introduced into a cellulose acetate through an ether group derived from a hydroxyl group, the specific atomic group being introduced with a substitution degree of 0.01 or more; the cellulose acetate comprising residual hydroxyl group in a substitution degree of 0.3 to 1.0,
   the stabilizer being at least one selected from the group consisting of a phosphite compound, a hindered phenol compound, a hindered amine compound, and a sulfur compound.

15 Claims, No Drawings

RESIN COMPOSITION AND MOLDED ARTICLE

CROSS-REFERENCE TO RELATED APPLICATIONS

This application is a Continuation of PCT/JP2012/062283 filed May 14, 2012, which claims priority from Japanese Patent Application No. 2011-110099 filed May 17, 2011, the above-noted applications are incorporated herein by reference in their entirety.

FIELD OF THE INVENTION

The present invention relates to a resin composition and a molded article.

BACKGROUND OF THE INVENTION

A synthetic resin prepared using, as a raw material petroleum, including a polycarbonate resin and ABS (acrylonitrile-butadiene-styrene) resin, is widely used for a member such as a housing of electric/electronic equipments such as a copier and a printer. In recent years, reduction of an amount of use of such synthetic resin is desired from a concern of exhaustion of fossil resources such as the petroleum, and a problem of emission of carbon dioxide during burning to be a cause of global warming.

As an alternative to a material derived from the fossil resources, a plastic derived from biomass attracts attention. As is different from the fossil resources buried in the ground, in the case of a biomass material, the material is produced by biosynthesis from carbon dioxide or the like originally in atmospheric air.

Accordingly, burning of the material is not accompanied by an increase in emission of carbon dioxide in atmospheric air according to calculation. The material may be referred to a so-called carbon-neutral material. For such a reason, use thereof is desired as a biodegradable material in an environment. However, achievement of well-balanced characteristics required for the member of electric/electronic equipments, such as heat resistance and impact resistance, has been difficult by application of the biomass material.

Cellulose attracts attention anew as a biomass material obtained from a plant these days. As a resin composition using cellulose ester, a proposal has been made for one composed of the cellulose ester, a non-cellulosic thermoplastic resin, a plasticizer, and a bleeding-out suppressant for suppressing bleeding-out of the plasticizer (see Patent Literature 1).

Patent Literature 2 describes a resin composition composed of cellulose ester, an aromatic polycarbonate resin and a compatibilizer. Thus, the composition is described to allow formation of a resin molded article that is excellent in impact strength and has appearance excellent in whiteness and without pearly gloss.

CITATION LIST

Patent Literatures

Patent Literature 1: JP-A-2007-161943 ("JP-A" means unexamined published Japanese patent application)
Patent Literature 2: JP-A-2006-111858

SUMMARY OF THE INVENTION

Problems that the Invention is to Solve

In view of full-scale development of a cellulose resin as a molded article using a biomass material, the present inventors have been continued research and development by considering that ones disclosed in the above-described Patent Literatures are not yet satisfactory and an improvement from both sides of product quality and molding processability is required. Specifically, for example, in the case of a resin composition using cellulose acetate, a thermal decomposition temperature and a flow and heat transfer temperature are close, and if an attempt is made for improving flow properties without allowing thermal decomposition, a low-molecular-weight plasticizer should be used. Thus, a problem was to solve a problem of volatility or the like during production. Moreover, a cellulose acetate-containing resin molded article lacks performance in impact resistant upon being used for a housing of electric/electronic equipments or the like in most cases. From such a viewpoint, the present inventors worked on maintaining a high level of impact resistance that tends to be a disadvantage of a molded article particularly using a biomass material, and further an improvement in quality and processability in production.

Thus, the present invention aims to the provision of a cellulose acetate-containing resin composition that prevents volatilization caused by a low-molecular-weight plasticizer or the like, and is excellent in injection moldability during production, and also in plane impact resistance of a product, and to the provision of a molded article thereof.

Means to Solve the Problem

That is, according to the present invention, there is provided the following means:
(1) A cellulose acetate resin composition comprising a cellulose acetate ether compound and a stabilizer;
the cellulose acetate ether compound comprising a specific atomic group represented by formula (1-1) or (1-2), the specific atomic group being introduced into a cellulose acetate through an ether group derived from a hydroxyl group, the specific atomic group being introduced with a substitution degree of 0.01 or more; the cellulose acetate comprising residual hydroxyl group in a substitution degree of 0.3 to 1.0,
the stabilizer being at least one selected from the group consisting of a phosphite compound, a hindered phenol compound, a hindered amine compound, and a sulfur compound;

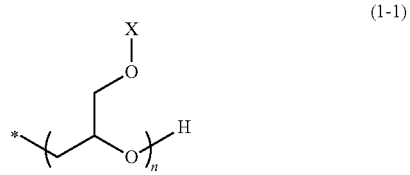

(1-1)

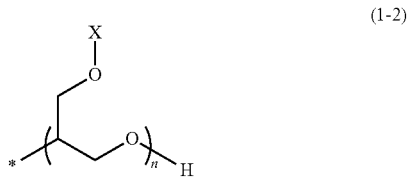

(1-2)

wherein, in formula (1-1) or (1-2), * represents a position to be bonded with the ether group derived from the hydroxyl group of the cellulose acetate; and n is 1 or 2.

(2) The resin composition as described in item (1), wherein the specific atomic group represented by formula (1-1) or (1-2) has a substitution degree of 0.05 to 0.20.

(3) The resin composition as described in item (1) or (2), wherein X in formulas (1-1) and (1-2) has at least one vinyl monomer unit represented by formula (2):

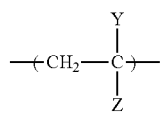
(2)

wherein Y represents a hydrogen atom or an alkyl group having 1 to 3 carbon atoms; and Z represents a hydrogen atom, an alkyl group, an alkoxycarbonyl group, a cyano group, a carboxyl group, an acyl group, an acyloxy group, an acylamino group, a carbamoyl group, an aminocarbonyl group, or an aromatic group.

(4) The resin composition as described in item (3), wherein Y in formula (2) is a group selected from a hydrogen atom and a methyl group; and Z is a group selected from the group consisting of a hydrogen atom, a methyl group, a methoxycarbonyl group, an ethyl acetoacetate oxycarbonyl group, an acetyloxy group, a phenyl group, a cyano group and a pyrrolidonyl group.

(5) The resin composition as described in item (4), wherein Y in formula (2) is a group selected from a hydrogen atom and a methyl group; and Z is a group selected from the group consisting of a hydrogen atom, a cyano group, an ethyl acetoacetate oxycarbonyl group, and a methoxycarbonyl group.

(6) The resin composition as described in any one of items (1) to (5), containing at least one thermoplastic resin.

(7) The resin composition as described in item (6), wherein polymer compound residues in formulas (1-1) and (1-2) contain a component of the thermoplastic resin as a repeating unit.

(8) The resin composition as described in item (6) or (7), wherein the thermoplastic resin is an aromatic polycarbonate resin, and an aromatic polycarbonate skeleton represented by formula (3) is contained in part of the polymer compound residues in formulas (1-1) and (1-2),

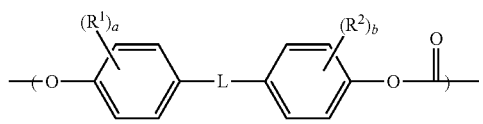
(3)

wherein $R^1$ and $R^2$ are each independently a halogen atom or a hydrocarbon group having 1 to 12 carbon atoms; a and b are each independently an integer of 0 to 4; when a or b is 2 or more, a plurality of $R^1$s and $R^2$s may be the same or different from each other; L represents a linking group selected from —O—, —S—,

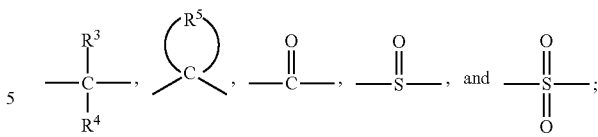

$R^3$ and $R^4$ each independently represent a hydrogen atom, a halogen atom or a hydrocarbon group having 1 to 12 carbon atoms; and $R^5$ represents an atomic group required for forming a cyclic hydrocarbon group having 6 to 15 carbon atoms.

(9) The resin composition as described in any one of items (6) to (8), wherein the thermoplastic resin forms a continuous phase and the cellulose acetate ether compound forms a dispersed phase.

(10) The resin composition as described in any one of items (1) to (9), wherein the stabilizer is a stabilizer of a phosphite compound or a hindered phenol compound.

(11) The resin composition as described in any one of items (1) to (10), containing at least one phosphorus compound flame retardant.

(12) The resin composition as described in any one of items (1) to (11), containing a fluorine-series resin.

(13) The resin composition as described in any one of items (1) to (12), wherein the cellulose acetate ether compound is a reaction product of a cellulose acetate having a residual hydroxyl group substitution degree of 0.3 to 1.0 and a polymer compound having a repeating unit represented by formula (1a):

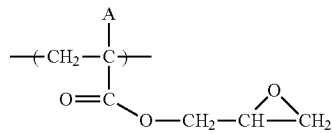
(1a)

wherein A represents a hydrogen atom or a methyl group.

(14) The resin composition as described in any one of items (1) to (13), wherein the cellulose acetate ether compound is contained in a mass ratio of 10% or more and less than 50%, based on the total mass of the resin composition.

(15) A method of producing the resin composition as described in any one of items (1) to (14), the method having the step of:

allowing a cellulose acetate having a residual hydroxyl group in a substitution degree of 0.3 to 1.0 to react with a polymer compound having a repeating unit represented by formula (1a):

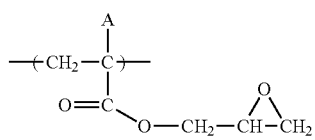
(1a)

wherein A represents a hydrogen atom or a methyl group.

(16) A molded article formed of the cellulose acetate resin composition as described in any one of items (1) to (14).

(17) A resin composition comprising a cellulose acetate, a stabilizer, and a polymer compound in combination;
the cellulose acetate having a residual hydroxyl group in a substitution degree of 0.3 to 1.0,
the stabilizer being at least one selected from the group consisting of a phosphite compound, a hindered phenol compound, a hindered amine compound, and a sulfur compound,
the polymer compound having a repeating unit represented by formula (1a):

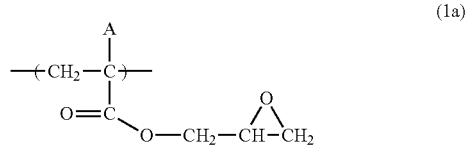

wherein A represents a hydrogen atom or a methyl group.

Effects of the Invention

A resin composition of the present invention has, as an improvement on production, prevented or suppressed volatilization caused by a low-molecular-weight compound, and is excellent in moldability due to a sufficiently large difference between a decomposition temperature and a flowing temperature. Moreover, when the resin composition is formed into a molded article as an improvement on a product, the product is excellent in plane impact resistance, and thus can be favorably used for a housing of electric/electronic equipments, and the like.

Other and further features and advantages of the invention will appear more fully from the following description.

MODE FOR CARRYING OUT THE INVENTION

The resin composition of the present invention contains a cellulose acetate resin having a polymer compound residue derived from a polymer compound having a glycidyl group, and a specific stabilizer. Thus, as described above, an improvement on production and an improvement on a product can be simultaneously achieved. A reason for producing such excellent functions and effects includes unclear points, but can be explained as follows, including a presumption. Specifically, since a polymer compound residue is introduced through a hydroxyl group of acetylcellulose, it is considered to effectively allow reduction of a flow start temperature while maintaining a decomposition temperature of the resin, which effect cannot be achieved by a mere mixture of both, and to lead to fulfillment of good moldability. On the other hand, even after molding, the above-described cellulose acetate ether compound forms a specific a matrix, which formation is considered to work for improving impact resistance of the resin. Further, the polymer compound residue of the above-described cellulose acetate ether compound functions in terms of compatibilizer, and achieves uniform mixing with a thermoplastic resin such as polycarbonate and the like. Thus, characteristics of the resin are effectively derived through specific morphology, and controllability of characteristics concerning resin blending can be improved. Hereinafter, preferable embodiments of the present invention are described. The term "composition" in the present invention refers to two or more components substantially uniformly existing at a specific formulation. Herein, the term "substantially uniformly" means that each component may be unevenly distributed in the range in which functions and effects of the invention are produced. Moreover, the composition is not particularly limited with regard to a form as long as the form meets the above-described definition, and means any form including a solid or powder constituted of a plurality of components without being limited to a fluid liquid or paste.

<Cellulose Acetate Ether Compound>

In a compound in which an organic compound residue is introduced into cellulose acetate through an ether group (hereinafter, may be occasionally referred to as "cellulose acetate ether compound") contained in the resin composition of the present invention, a specific atomic group represented by the following formula (1-1) or formula (1-2) is substituted, with a hydroxyl group substitution degree of 0.01 or more, into a hydroxyl group of cellulose acetate with a residual hydroxyl group substitution degree of 0.3 to 1.0. In addition, the term "residual hydroxyl group substitution degree" is expressed in terms of the number of hydroxyl groups that remain without being esterified among three hydroxyl groups existing in a glucose unit in cellulose, and is a value evaluated as a mean value in a cellulose molecule. When all the hydroxyl groups remain, the degree is expressed as 3, and when all the hydroxyl groups are esterified, the degree is expressed as 0. The hydroxyl group substitution degree is a substitution degree in the glucose unit in a similar manner, and when all the hydroxyl groups are substituted, the degree is expressed as 3 at maximum, and when no hydroxyl group is substituted, the degree is expressed as 0.

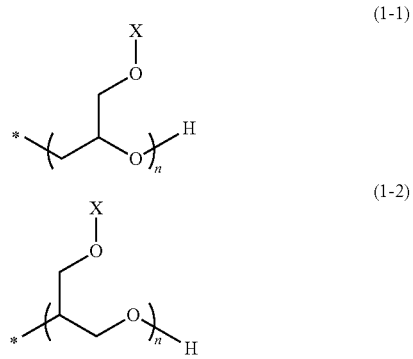

(In formula (1-1) or (1-2), * represents a position at which the group bonds to cellulose acetate via an ether group. X represents a monovalent polymer compound residue. n is 1 or 2.)

~Compatibilizer Substitution Degree~

Specifically, the cellulose acetate ether compound can be specifically represented as a polymer compound having a repeating unit of the following formula (A). On this occasion, in the following formula, R is any one of an acetyl group, a specific atomic group represented by formula (1-1) or (1-2), or a hydrogen atom. A mean substitution degree is 2.0 to 2.7 for the acetyl group, and 0.01 or more for the specific atomic group represented by formula (1-1) or formula (1-2) (in the specification, the substitution degree may be occasionally referred to as "compatibilizer substitution degree".). A preferred range of an acetyl substitution degree (the above-described residual hydroxyl group substitution degree, conversely) is described later. The compatibilizer substitution degree is not particularly limited, if the degree is 0.01 or more, but is preferably 0.03 or more, and further preferably 0.05 or more. The upper limit thereof may be 1 in a relation with the residual hydroxyl group substitution degree, but is practically 0.3 or less. The degree is most preferably 0.05 or more and 0.20 or less. A case where the compatibilizer substitution degree is more than the above-described lower limit is preferred in view of an improvement in plasticity of the resin composition or the molded article. On the other hand, a case where the degree is equal to or less than the upper limit is preferred in view of stiffness of the molded article.

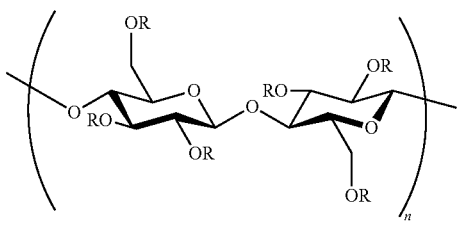

The above-described cellulose acetate ether compound can be obtained by allowing a polymer compound containing a glycidyl group and X in formula (1-1) or formula (1-2) to react with a cellulose acetate having a residual hydroxyl group substitution degree of 0.3 to 1.0. The polymer compound containing the glycidyl group and X in formula (1-1) or formula (1-2) preferably has a structure of the following formula (1a).

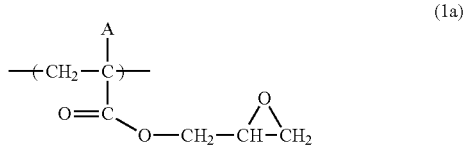

A is a hydrogen atom or a methyl group.

The monomer unit represented by formula (1a) is preferably contained in 1% by mass or more, further preferably 2 to 50% by mass, and still further preferably 5 to 30% by mass, based on the total of X. In terms of a mole fraction (100%) of a monomer derived from copolymerization components, a mole fraction of the monomer unit is preferably 0.2 to 50%, and further preferably 0.5 to 30%.

Further preferably, the above-described X contains a vinyl-based monomer unit represented by the following formula (2). In other words, the X preferably has a repeating unit of the above-described formula (1a), and a repeating unit represented by the following formula (2), (3) or the like.

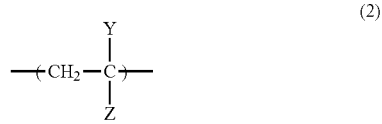

In formula (2), Y represents a hydrogen atom or an alkyl group having 1 to 3 carbon atoms, preferably a hydrogen atom or a methyl group.

Z represents a hydrogen atom, an alkyl group (above all, preferably an alkyl group having 1 to 3 carbon atoms, and further preferably, a methyl group), an alkoxycarbonyl group (above all, an alkoxycarbonyl group having 2 to 7 carbon atoms, and further preferably, a methoxycarbonyl group or an ethyl acetoacetate oxycarbonyl group), a cyano group, a carboxyl group, an acyloxy group (preferably, an acetyloxy group), an acylamino group (preferably, pyrrolidonyl group), a carbamoyl group (preferably, N,N-dimethylacrylamide group) or an aromatic group (preferably, phenyl group).

In addition, the above-mentioned alkyl group, alkoxycarbonyl group, acyloxy group, acylamino group, and carbamoyl group may be any of linear, branched or cyclic group, and the aromatic group may be any of a monocycle and a condensed ring (heterocycle).

When a polymer chain constituted of the unit represented by formula (2) has a copolymerization structure of a plurality of monomers, a combination of at least two of a unit having $Z_1$, a unit having $Z_2$, a unit having $Z_3$ and a unit having $Z_4$ as described below is preferred. In the following, the combination is represented as an option $Z_1$, $Z_2$, $Z_3$ or $Z_4$ of Z of formula (2).

$Z_1$: at least one of a hydrogen atom and a methyl group (further preferably, a hydrogen atom);

$Z_2$: at least one of a methoxycarbonyl group, an ethyl acetoacetate oxycarbonyl group and an acetyloxy group (further preferably, having at least one of an ethyl acetoacetate oxycarbonyl group and a methoxycarbonyl group);

$Z_3$: at least one of a cyano group and a phenyl group (further preferably, a phenyl group); and $Z_4$: at least one of a cyano group and a pyrrolidonyl group (further preferably, a cyano group).

A ratio of copolymerization is not particularly limited, but a unit having $Z_1$ is preferably 0 to 95 mol % (further preferably 5 to 80 mol %), a unit having $Z_2$ is preferably 0 to 75 mol % (further preferably 5 to 60 mol %), a unit having $Z_3$ is preferably 0 to 50 mol % (further preferably 5 to 40 mol %) and a unit having $Z_4$ is preferably 0 to 75 mol % (further preferably 5 to 60 mol %). In addition, a case where units having $Z_1$, $Z_2$, $Z_3$, and $Z_4$ have a combination of identical monomer units is excluded.

The vinyl-based monomer unit represented by formula (2) is preferably contained in 20% by mass or more, further preferably 25 to 95% by mass, and particularly preferably 30 to 95% by mass, based on the total of X. When the polymer chain includes the vinyl-based monomer unit of formula (2) at such a ratio, a local energy absorption site microscopically dispersed inside the material is formed, and a craze is formed when the site is subjected to impact such as plane impact, and therefore an effect for improving impact resistance is produced. In terms of a mole fraction (100%) of a monomer derived from copolymerization components, a mole fraction of the monomer unit is preferably 3 to 98%, and further preferably 5 to 98%.

In the resin composition of the present invention, the cellulose acetate ether compound and an unreacted compatibilizer (glycidyl group-containing polymer compound) are microscopically dispersed in the material, and thus a dispersed phase is formed. The impact resistance is improved when energy is absorbed, during a breaking test, into this dispersed phase per se, a cavitation generated in the dispersed phase, and a craze generated in a continuous phase by the dispersed phase. A structure of the vinyl-based monomer unit introduced into the cellulose ether compound that forms the dispersed phase contributes to properties of the dispersed phase per se, and the craze generated by the dispersed phase.

Specifically, hardness of a vinyl monomer unit is considered to relate to performance in the energy absorption site, and polarity of the vinyl monomer unit is considered to relate to performance relating to craze formation (distribution size). With regard to the hardness, if the composition has a soft vinyl component having a glass transition temperature of 50° C. or lower in the compatibilizer, the composition is considered to be excellent in an effect on improving the impact resistance.

Specific examples of the soft vinyl components include a hydrogen atom in ethylene, methyl acrylate, ethyl acetoacetate methacrylate and vinyl acetate, and a monomer unit having a group such as a methoxycarbonyl group, an acetoacetate ethyloxycarbonyl group and an acetyloxy group. A composition containing a compatibilizer having no soft vinyl component has a higher effect on improving plane impact resistance in comparison with a composition having no compatibilizer, but has a poorer effect in comparison with the composition containing the soft vinyl component-containing compatibilizer. Moreover, when a ratio of the soft vinyl component decreases, the plane impact performance decreases to some extent.

With regard to the polarity of the vinyl monomer unit, a composition contains a compatibilizer having a polar vinyl monomer unit as a compatibilizer component, thereby adjusting a state of an interface between the dispersed phase and the continuous phase to allow a decrease in a craze size, which can be considered to cause an excellent effect on improving the plane impact resistance. This effect is considered to be caused by an increase in affinity with cellulose acetate by introduction of polar structure. Specific examples of the structure for increasing the affinity with cellulose acetate include, as Z in formula (2), an alkoxycarbonyl group, a cyano group, a carboxyl group, a carbamoyl group, and an aminocarbonyl group.

According to the present embodiment, when the soft vinyl component is introduced into a specific polymer compound residue as mentioned above, an effect of the cellulose ether compound is derived much more effectively in the composition, and in combination with working with a specific stabilizer, thermoplastic resin or the like, an effect on improving the plane impact resistance can be further made excellent while maintaining varieties of good performance required for a molded article of this kind.

It is preferable that the resin composition of the present invention contains at least one thermoplastic resin component described below. Moreover, the above-described polymer compound residue X preferably has a skeleton identical with the skeleton of this thermoplastic resin in part. Specifically, part of this polymer compound residue X is preferably has a structure of the following formula (3).

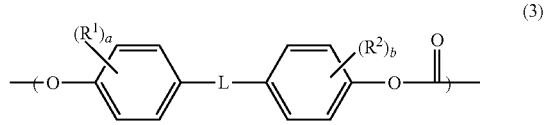

(3)

In formula (3), $R^1$ and $R^2$ are each independently a hydrogen atom, a halogen atom (for example, a chlorine atom, a bromine atom) or a hydrocarbon group having 1 to 12 carbon atoms. Examples of the hydrocarbon group include an alkyl group and an aryl group. $R^1$ and $R^2$ each are preferably an alkyl group having 1 to 6 carbon atoms, an aryl group, a hydrogen atom; particularly preferably a methyl group.

a and b are each independently an integer of 0 to 4, when a or b is 2 or more, a plurality of $R^1$s and $R^2$s may be the same or different from each other.

L represents a divalent linking group selected from —O—, —S—,

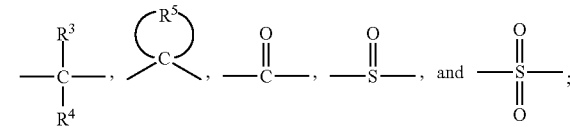

and combinations thereof.

$R^3$ and $R^4$ each independently represent a hydrogen atom, a halogen atom (for example, a chlorine atom, a bromine atom), or a hydrocarbon group having 1 to 12 carbon atoms. Examples of the hydrocarbon group include an alkyl group or an aryl group; preferably an alkyl group having 1 to 6 carbon atoms, an aryl group having 6 to 12 carbon atoms, a hydrogen atom; particularly preferably a methyl group.

$R^5$ is an atomic group required for forming a cyclic hydrocarbon group having 6 to 15 carbon atoms, and preferably, an atomic group required for forming a cyclohexyl group or a fluorene group.

In the present invention, the polymer compound residue derived from a glycidyl group-containing polymer compound is expected to develop an effect on compatibilizing an aftermentioned thermoplastic resin with the cellulose acetate compound to be bonded with the residue. So as to effectively obtain the working, the repeating unit of the skeleton of a same kind with the skeleton of the thermoplastic resin is preferably introduced into the above-described polymer compound residue X. For example, in the case of combination with a polycarbonate resin, the polymer compound residue X preferably has a polycarbonate skeleton.

The aromatic polycarbonate unit represented by formula (3) is preferably contained in 20% by mass or more, further preferably 25 to 75% by mass, and particularly preferably 35 to 75% by mass, based on the total of X. When the aromatic polycarbonate unit of formula (3) is contained at such a ratio, compatibility and interface strength between cellulose acetate and polycarbonate significantly increase, and a material that is excellent in impact resistance is formed.

The content of the above-described cellulose acetate ether compound in the resin composition according to the present invention is preferably 10% by mass or more and less than 50% by mass, and further preferably 20% by mass or more and less than 50% by mass, in terms of the content based on the total mass. In terms of a mole fraction (100%) of a monomer derived from copolymerization components, a mole fraction of the monomer unit is preferably 1 to 50%, and further preferably 3 to 40%.

The above-described cellulose acetate ether compound can be synthesized by reacting a glycidyl group-containing polymer compound to a cellulose acetate.

In the present specification, when a term is designated by placing a word "compound" on the term end, the term is used in the meaning of the compound per se, and also a salt thereof, a complex thereof and an ion thereof. Moreover, the term is used in the meaning of including a derivative accompanying a predetermined substituent or partially chemically modified within the range in which a desired effect is exhibited. In an organic acid or the like, the term is used in the meaning including an acid ester thereof. Moreover, in the present specification, when a term is designated by placing a word "group" on the term end with regard to a substituent, the term is used in the meaning in which the group may arbitrarily have a substituent.

The cellulose acetate and the glycidyl group-containing polymer compound to be used as raw materials are explained below.

(Cellulose Acetate)

Cellulose acetate can be produced by an ordinary esterification method for allowing cellulose to react with an acylating agent, and according to the necessity, can be produced through a saponification or aging step. Cellulose acetate can be ordinarily produced by activating pulp (cellulose) with an activator (activation step), preparing ester (diacetate) with an acylating agent using a catalyst such as sulfuric acid (acylation step), and adjusting a degree of esterification by saponification (hydrolysis) and aging (saponification and aging step). In the case of cellulose acetate, cellulose acetate can be produced by a method that is ordinarily applied, such as a sulfuric acid catalyst method, an acetic acid method and a methylene chloride method.

A hydroxyl group substitution degree of cellulose acetate used in the present invention is 2.0 to 2.7 (residual hydroxyl group substitution degree of 0.3 to 1.0).

~Residual Hydroxyl Group Substitution Degree~

A ratio of the acylating agent in the acylation step can be selected in the range in which a desired acylation degree (acetylation degree) is achieved. In the present invention, the residual hydroxyl group substitution degree is adjusted to be 0.3 to 1.0, preferably 0.5 to 1.0, and further preferably 0.4 to 0.7. Cellulose acetate has the acetyl group at such a ratio, thereby making a relation between a glass transition temperature and a thermal decomposition temperature of cellulose acetate favorable, allowing ensuring of good moldability even without using a low-molecular-weight plasticizer, and allowing an improvement in the plane impact resistance when molded.

As a catalyst for acylation or aging, sulfuric acid is usually used. An amount of sulfuric acid to be used is usually approximately 0.5 to approximately 15 parts by mass, preferably approximately 5 to approximately 15 parts by mass, and further preferably approximately 5 to approximately 10 parts by mass, based on 100 parts by mass of cellulose. Moreover, a temperature of saponification and aging can be selected from the ranges of 40 to 160° C., and for example, is approximately 50 to 70° C.

Further, in order to neutralize remaining sulfuric acid, treatment with alkali may be applied.

The degree of polymerization of cellulose ether is not particularly limited and is approximately 200 to 400, preferably approximately 250 to 400, more preferably approximately 270 to 350 in terms of viscosity average degree of polymerization. The viscosity average degree of polymerization can be measured by the method described in paragraph Nos. [0018] to [0019] of JP-A-9-77801.

The molecular weight of cellulose acylate is not particularly limited, preferably 20,000 to 200,000, more preferably 30,000 to 100,000 in terms of number average molecular weight. A measuring method is not particularly limited, but GPC that is similar to one presented in Examples is preferably applied. As a carrier, THF or NMP is preferably used, depending on a kind of a cellulose compound.

(Glycidyl Group-Containing Polymer Compound [Compatibilizer])

The glycidyl group-containing polymer compound used in the present invention is preferably a polymer compound having the glycidyl group and the polymer compound residue X of the above-described formula (1-1) or (1-2), and having the repeating unit represented by the above-described formula (1a). A preferred one thereof is as mentioned above, but furthermore, the glycidyl group-containing polymer compound used in the present invention is formed by polymerizing, for example, glycidyl methacrylate (GMA) and a vinyl component, in accordance with a desired structure of the polymer compound residue X of the above-described formula (1), and according to the necessity, a compound having a thermoplastic skeleton.

Specific examples of the vinyl component include ethylene, propylene, vinyl acetate, vinyl pyrrolidone, acrylate (for example, methyl acrylate), methacrylate (for example, methyl methacrylate), acrylamide (for example, N,N-dimethylacrylamide), acrylonitrile, methacrylonitrile, styrene, and a copolymer selected from the group of these components. Commercial items, such as Bond Fast BF7M, BF7B or BF2C (trade names for all, manufactured by Sumitomo Chemical Co., Ltd.), or MODIPER A4400 or C L430-G (trade names for all, manufactured by NOF Corporation), can also be used.

For confirmation, a reaction scheme of the glycidyl group-containing polymer compound and the residual hydroxyl group of cellulose acetate is shown below. Herein, A is the same as that of formula (1a). Cell stands for a cellulose acetate residue, and Cell-OH stands for cellulose acetate having a residual hydroxyl group.

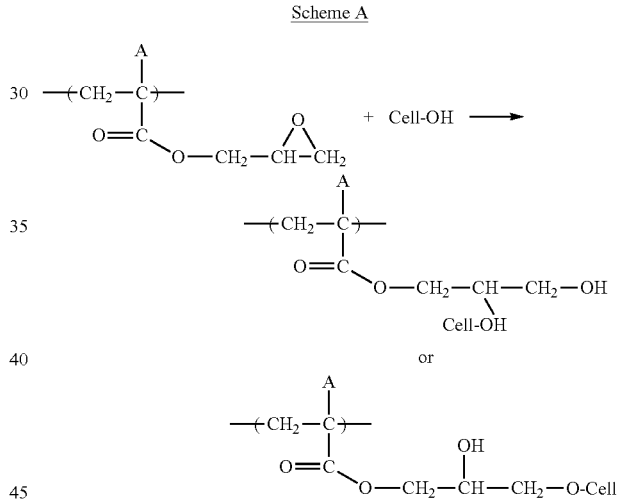

The above-described reaction only needs to be progressed by a usual method, and for example, can be performed by heating a resin mixture to 180 to 300° C. and kneading the mixture. In terms of the step for producing a resin molded article in the present invention, it is effective that, for example, a resin raw material containing, as a raw resin, the cellulose acetate compound and the above-described glycidyl group-containing polymer compound together with the above-described stabilizer is heated and kneaded using a kneader to allow mixing and flowing of the raw material and simultaneously progress of the above-described reaction.

An amount of the glycidyl group-containing polymer compound to be used is preferably 3 to 100 parts by mass, more preferably 20 to 100 parts by mass, based on 100 parts by mass of cellulose. A flowing temperature of the cellulose acetate compound can be decreased by this reaction with the glycidyl group-containing compound. Moreover, when the thermoplastic resin is incorporated thereinto, dispersibility of the cellulose acetate ether compound into the thermoplastic resin is improved. As a result, flowing properties (molding processability) of the resin composition and the plane impact resistance of the molded article are improved.

In addition, a difference (ΔT) between the flowing temperature and the decomposition temperature of the resin composition according to the present invention is preferably 20° C. or higher, further preferably 30° C. or higher, and particularly preferably 35° C. or higher. When the difference is within such a range, degradation by decomposition is suppressed and molding is allowed. Unless otherwise noted, the term "flowing temperature" or "decomposition temperature" in the present invention refers to a value determined by the measuring method and a measuring device described in Examples.

The molecular weight of the glycidyl group-containing polymer compound is not particularly limited, preferably 3,000 to 300,000, more preferably 5,000 to 200,000 in terms of mass average molecular weight. A measuring method is not particularly limited, but GPC that is similar to one presented in Examples is preferably applied. As a carrier, THF is preferably used, depending on a kind of the glycidyl group-containing polymer compound.

As a method of producing the compatibilizer (glycidyl group-containing polymer compound), a generally known polymerization reaction (radical polymerization, cationic polymerization, anionic polymerization, coordination polymerization or the like) can be applied, and radical polymerization is particularly preferred from viewpoints of production aptitude and cost. Moreover, radical polymerization may be performed according to any method of bulk polymerization, emulsion polymerization and solution polymerization.

Further, as a method of producing a compatibilizer having an aromatic polycarbonate skeleton in the present invention, a publicly known method (for example, a grafting method as described in JP-A-2010-90212) can be applied. Specific examples of polycarbonate-based resins include a polycarbonate-based resin having a reactive unsaturated terminal group. This polycarbonate-based resin having the unsaturated terminal group is produced by a production method in a manner similar to producing a conventional polycarbonate-based resin except that a monofunctional compound having a double bond is used as a molecular weight regulator or a terminal stopper, or the compound and a conventional terminal stopper are simultaneously used, more specifically, such as an interfacial polymerization process, a pyridine process, and also a solution process such as a chloroformate process.

Specific examples of the monofunctional compound having the double bond for introducing an unsaturated terminal group include: an unsaturated carboxylic acid such as acrylic acid, methacrylic acid, vinyl acetic acid, 2-pentenoic acid, 3-pentenoic acid, 5-hexenoic acid, 9-decenoic acid and 9-undecenoic acid; an acid chloride or chloroformate such as acrylic acid chloride, methacrylic acid chloride, sorbic acid chloride, allyl alcohol chloroformate, isopropenylphenol chloroformate, or hydroxystyrene chloroformate; and phenols having unsaturated acid such as isopropenylphenol, hydroxystyrene, hydroxyphenyl maleimide, hydroxybenzoic acid allyl ester or hydroxymethyl benzoate allyl ester.

These compounds may be used together with a conventional terminal stopper, and the terminal stopper is ordinarily used in the range of 1 to 25 mol %, and preferably, 1.5 to 10 mol %, based on 1 mol of the above-described divalent phenol compound.

The above-mentioned polycarbonate derivative having the polymerizable terminal is mixed with other polymerizable compounds to allow polymerization by a conventional technique, and thus a compatibilizer having a site including a polycarbonate structure can be synthesized.

<Stabilizer>

The resin composition according to the present invention contains a stabilizer selected from a phosphite compound (or phosphonite compound), a hindered phenol compound, a hindered amine compound, and a sulfur compound. The stabilizer functions to increase the decomposition temperature of the cellulose acetate ether compound and increase a difference between the decomposition temperature and the flowing temperature. A phosphite compound (occasionally, may be referred to as a phosphite-based antioxidant) or a hindered phenol compound (occasionally, may be referred to as a hindered phenol antioxidant) is preferred. Specific examples of the phosphite-based antioxidant and/or the phosphonite-based antioxidant include a phosphite-based antioxidant such as triphenyl phosphite, tris(4-methylphenyl)phosphite, tris (4-t-butylphenyl)phosphite, tris(monononylphenyl)phosphite, tris(2-methyl-4-ethylphenyl)phosphite, tris(2-methyl-4-t-butylphenyl)phosphite, tris(2,4-di-t-butylphenyl) phosphite, tris(2,6-di-t-butylphenyl)phosphite, tris(2,4-di-t-butyl-5-methylphenyl)phosphite, tris(mono-, di-nonyl phenyl)phosphite, bis(monononylphenyl)pentaerythritol-di-phosphite, bis(2,4-di-t-butylphenyl)pentaerythritol-di-phosphite, bis(2,6-di-t-butyl-4-methylphenyl)pentaerythritol-di-phosphite, bis(2,4,6-tri-t-butylphenyl)pentaerythritol-di-phosphite, bis(2,4-di-t-butyl-5-methylphenyl) pentaerythritol-di-phosphite, (2,6-di-t-butyl-4-methylphenyl)pentaerythritol-di-phosphite, 2,2-methylene bis(4,6-dimethylphenyl)octyl phosphite, 2,2-methylene bis (4-t-butyl-6-methylphenyl)octyl phosphite, 2,2-methylene bis(4,6-di-t-butylphenyl)octyl phosphite, 2,2-methylene bis (4,6-dimethylphenyl)hexyl phosphite, 2,2-methylene bis(4, 6-di-t-butylphenyl)hexyl phosphite and 2,2-methylene bis(4, 6-di-t-butylphenyl)stearyl phosphite; and phosphonite-based antioxidants, such as tetrakis(2,4-di-t-butylphenyl)-4,4'-biphenylene diphosphonite and tetrakis(2,4-di-t-butyl-5-methylphenyl)-4,4'-biphenylene diphosphonite. These may be used alone or in combination of two or more thereof. Among these antioxidants, bis(2,6-di-t-butyl-4-methylphenyl)pentaerythritol diphosphite, tris (2,4-di-t-butylphenyl)phosphite, tetrakis(2,4-di-t-butylphenyl)-4,4'-biphenylene diphosphonite or tetrakis(2,4-di-t-butyl-5-methylphenyl)-4,4'-biphenylene diphosphonite is particularly preferred.

Specific examples of the hindered phenol-based antioxidant include triethyleneglycol-bis[3-(3-t-butyl-5-methyl-4-hydroxyphenyl)propionate], 1,6-hexanediol-bis[3-(3,5-di-t-butyl-4-hydroxyphenyl)propionate], 2,4-bis(n-octylthio)-6-(4-hydroxy-3,5-di-t-butylanilino)-1,3,5-triazine, pentaerythrityl tetrakis[3-(3,5-di-t-butyl-4-hydroxyphenyl) propionate], 2,2-thio-diethylene bis[3-Z(3,5-di-t-butyl-4-hydroxyphenyl)propionate], 2,2-thio-diethylene bis[3-(3,5-di-t-butyl-4-hydroxyphenyl)propionate] and octadecyl-3-(3,5-di-t-butyl-4-hydroxyphenyl)propionate. In particular, pentaerythrityl tetrakis[3-(3,5-di-t-butyl-4-hydroxyphenyl) propionate] or 2,2-thio-diethylene bis[3-Z(3,5-di-t-butyl-4-hydroxyphenyl)propionate] is suitably used.

The content of the stabilizers is preferably 0.01 to 2.0% by mass, and more preferably 0.1 to 0.5% by mass, based on the total solid of the resin composition. When the content is adjusted to be the above-described lower limit or more, the difference (ΔT) between the flowing temperature and the decomposition temperature of the resin composition can be extended, and when the content is adjusted to be the above-described upper limit or less, a decrease in a heat deflection temperature by addition of the stabilizer can be suppressed. Moreover, when the phosphite-based antioxidant and the hindered phenol-based antioxidant that have different antioxidant mechanisms are simultaneously used, a significantly large difference (ΔT) between the flowing temperature and the decomposition temperature can be obtained, and such a case is further preferred. The hindered phenol-based antioxidant invalidates a radical generated, and the phosphite-based antioxidant decomposes the resulting peroxide into a harmless substance and prevents generation of a new radical. The hindered amine-based antioxidant can be used with a role similar to the role of the hindered phenol-based antioxidant, and a sulfur-based antioxidant can be used with a role similar to the role of the phosphite-based antioxidant. Among the antioxidants, a combination of suitable ones is preferably applied, which is a combination of at least one of phosphite-based antioxidant selected from bis(2,6-di-t-butyl-4-methylphenyl)pentaerythritol diphosphite, tris(2,4-di-t-butylphenyl)phosphite, tetrakis(2,4-di-t-butylphenyl)-4,4'-biphenylene diphosphonite, or tetrakis(2,4-di-t-butyl-5-methylphenyl)-4,4'-biphenylene diphosphonite, and at least one of hindered phenol-based antioxidant selected from pentaerythrityl-tetrakis[3-(3,5-di-t-butyl-4-hydroxyphenyl)propionate] and 2,2-thio-diethylene bis[3-Z(3,5-di-t-butyl-4-hydroxyphenyl)propionate]. Among them, a combined use of (2,6-di-t-butyl-4-methylphenyl)pentaerythritol diphosphite and pentaerythrityl-tetrakis[3-(3,5-di-t-butyl-4-hydroxyphenyl) propionate] is particularly preferred.

<Thermoplastic Resin>

It is preferable that the resin composition of the present invention further contains a thermoplastic resin. On this occasion, as mentioned above, the composition preferably includes the skeleton of the thermoplastic resin in X in the above-described formula (1).

The thermoplastic resin that can be used in the present invention is not particularly limited, and specific examples include polyethylene (PE), polypropylene (PP), polystyrene (PSt), polyethylene terephthalate (PET), a polycarbonate resin (PC), aromatic polyester, polyphenylene ether, polyetherimide and polyphenylene sulfide. Among them, a polycarbonate resin used in combination with a cellulose acetate ether compound is preferred for the reason of an excellent balance among stiffness, impact resistance, heat resistance and moldability.

Further, the number average molecular weight of the thermoplastic resin is preferably from 15,000 to 30,000. The reason is that mechanical strength is improved when the number average molecular weight is 15,000 or more, and moldability is improved when the number average molecular weight is 30,000 or less. A value of the number average molecular weight is determined, for example, by using N-methyl pyrrolidone as a solvent, and a polystyrene gel, and using an equivalent molecular-weight calibration curve predetermined from a calibration curve of standard monodisperse polystyrene. As a GPC apparatus, HLC-8220GPC (manufactured by TOSOH CORPORATION) can be used.

Polycarbonate Resin

In the present embodiment, specific examples of the polycarbonate resin include an aromatic polycarbonate resin and an aromatic-aliphatic polycarbonate resin. Specific examples of the aromatic polycarbonate resin include a thermoplastic aromatic polycarbonate polymer obtained by allowing an aromatic dihydroxy compound to react with phosgene or diester of carbonic acid or a copolymer thereof.

Specific examples of the aromatic dihydroxy compound include 2,2-bis(4-hydroxyphenyl)propane (=bisphenol A), tetramethyl bisphenol A, bis(4-hydroxyphenyl)-p-diisopropylbenzene, hydroquinone, resorcinol, 4,4-dihydroxybiphenyl, 2,2-bis(4-hydroxy-3,5-dimethylphenyl)propane, bis(4-hydroxyphenyl)methane, 1,1-bis(4-hydroxyphenyl)ethane, 2,2-bis(4-hydroxyphenyl)butane, 2,2-bis(4-hydroxy-3,5-diphenyl)butane, 2,2-bis(4-hydroxy-3,5-diethylphenyl)propane, 2,2-bis(4-hydroxy-3,5-diethylphenyl)propane, 1,1-bis(4-hydroxyphenyl)cyclohexane and 1-phenyl-1,1-bis(4-hydroxyphenyl)ethane. These can be used alone or as a mixture thereof. Specific examples preferably include Bisphenol A. For the purpose of further improving flame retardancy, a compound in which at least one tetraalkyl phosphonium sulfonate is bonded with the above-described aromatic dihydroxy compound, a polymer having a siloxane structure and phenolic OH groups at both terminals, or an oligomer thereof can be used.

Specific examples of the aromatic polycarbonate resin that can be used in the present invention preferably include a polycarbonate resin derived from 2,2-bis(4-hydroxyphenyl)propane or a polycarbonate copolymer derived from 2,2-bis(4-hydroxyphenyl)propane and any other aromatic dihydroxy compound. Further, the polycarbonate resins of two or more thereof may be used in combination.

Specific examples of the aromatic-aliphatic-polycarbonate resin that can be used in the present invention include a copolymer of the above-described aromatic polycarbonate resin with an aliphatic polycarbonate resin as described below. For the reason of improving compatibility with a cellulose derivative, a ratio of copolymerization of an aromatic component to an aliphatic component is preferably 95/5 to 30/70, and further preferably 90/10 to 50/50.

The aliphatic polycarbonate resin that can be used for copolymerization of the aromatic-aliphatic polycarbonate resin is preferably formed of an aliphatic diol residue having 2 to 12 carbon atoms. Specific examples of the aliphatic diols include ethylene glycol, 1,3-propylene glycol, 1,4-butanediol, 1,5-pentanediol, 1,6-hexanediol, 1,8-octanediol, 2,2-dimethyl-1,3-propanediol, 3-methyl-1,5-pentanediol, 2,4-diethyl-1,5-pentanediol, 1,9-nonanediol, 2-methyl-1,8-octanediol, 5-membered ring diols such as 1,2-cyclopentanediol, 1,3-cyclopentanediol, bis(hydroxymethyl)tricyclo-[5.2.1.0]decane, erythritane and isosorbide, six-membered ring diols such as 1,2-cyclohexanediol, 1,3-cyclohexanediol, 1,4-cyclohexanediol, 1,2-cyclohexane dimethanol, 1,3-cyclohexane dimethanol, 1,4-cyclohexane dimethanol, 2,2-bis(4-hydroxycyclohexyl)-propane, 1,3-adamantane diol, 1,3-adamantane dimethanol, 4,9:5,8-dimethano-1(2),6(7)-hydroxymethyl-3a,4,4a,5,8,8a,9,9a-octahydro-1H-benzoindene, 2,3-norbornane diol, 2,3-norbornane dimethanol, 2,5-norbornane diol and 2,5-norbornane dimethanol, and spiro ring diols such as spiroglycol. In particular, alicyclic aliphatic diols are preferred in view of stiffness and heat resistance of a molding material obtained. These components may be used alone or in combination of two or more thereof, according to the necessity.

A method of producing the polycarbonate resin in the present invention is not limited, and the polycarbonate resin can be produced by a phosgene method (interfacial polymerization method), a melting method (transesterification method), a non-phosgene method using carbon dioxide as a raw material, or the like. Further, an aromatic polycarbonate resin having an adjusted amount of OH group in a terminal group that is produced by the melting method can be used.

Further, as the aromatic polycarbonate resin, not only a primary raw material but also an aromatic polycarbonate resin recycled from a used product, i.e. a so-called material-recycled aromatic polycarbonate resin can also be used. Specific examples of the used product preferably include a used one of an optical recording medium such as an optical disc, a lightguide plate, a vehicle transparent members such as an automotive windowpane, an automobile headlamp lens and a windshield, a vessel such as a water bottle, a glass lens, and a building component such as a sound insulating wall, a glass-paned window and a corrugated plate. Moreover, as the recycled aromatic polycarbonate resin, a pulverized product obtained from a non-conforming product, a sprue or a runner, or a pellet obtained by melting the products, or the like can also be used.

In the present invention, a commercial item can also be used as the polycarbonate resin. Specific examples thereof include Panlite L1225Y: polycarbonate resin having a bisphenol A skeleton (Mn=25,000) (manufactured by Teijin Chemicals Ltd.), and Panlite L1225L: polycarbonate resin having a bisphenol A skeleton (Mn=21,000) (manufactured by Teijin Chemicals Ltd.). Moreover, an alloy resin containing polycarbonate, for example, a polycarbonate/ABS alloy resin can also be preferably used. Specific examples of commercial items include "Multilon TN-7500": polycarbonate/ABS alloy resin, manufactured by Teij in Chemicals Ltd.

When the aromatic polycarbonate resin is used in the present invention, the resin composition preferably has morphology in which the aromatic polycarbonate resin forms a continuous phase, and the cellulose acetate ether compound forms a dispersed phase. When such morphology is formed, a resin composition having high flame retardancy is formed by simultaneously using a flame retardant. The size of dispersion is preferably from 0.1 to 10 µm.

The content of the thermoplastic resin is not particularly limited, but 35% by mass or more is preferably contained in the composition. Then, 35 to 95% by mass is further preferably contained, and 35 to 80% by mass is still further preferably contained. When the content is adjusted to be the above-described numerical value or more, the aromatic polycarbonate resin can form the continuous phase in a resin composition, and when the flame retardant is simultaneously used, a resin composition having high flame retardancy can be produced.

<Flame Retardant>

It is preferable that the resin composition of the present invention contains a phosphorus-containing flame retardant. Due to the phosphorus-containing flame retardant, a flame retardant effect such as a decrease or suppression of burning rate can be improved.

Moreover, the phosphorus-containing flame retardant has advantages, in comparison with generally used other flame retardants such as a brominated flame retardant and a chlorinated flame retardant, of causing neither corrosion of a processing machine or a mold nor deterioration of a working environment due to generation of hydrogen halide during blending with a resin or during molding processing, and less possibility of adversely affecting an environment due to emission of halogen, or decomposition to generate a hazardous substance such as dioxin during incineration disposal. Further, in comparison with generally used flame retardants such as a silicon-containing flame retardant, a nitrogen compound-based flame retardant and an inorganic flame retardant, the phosphorus-containing flame retardant has advantages of larger flame-retarded effect and suppression of a decrease in flexural modulus and impact resistance.

The phosphorus-containing flame retardant in the present invention is not particularly limited, and one in common use can be used. Specific examples thereof include an organic phosphorus-based compound such as phosphate, condensed phosphate and polyphosphate. From a viewpoint of improvement in thermally stability of a resin material, phosphate is preferred, and from a viewpoint of prevention of volatilization or suppression of bleeding-out during molding processing, condensed phosphate (compound having two or more phosphate units in a molecule) is further preferred.

Specific examples of the phosphate include trimethyl phosphate, triethyl phosphate, tributyl phosphate, tri(2-ethylhexyl)phosphate, tributoxyethyl phosphate, triphenyl phosphate, tricresyl phosphate, trixylenyl phosphate, tris (isopropylphenyl)phosphate, tris(phenylphenyl)phosphate, trinaphthyl phosphate, cresyldiphenyl phosphate, xylenyldiphenyl phosphate, diphenyl(2-ethylhexyl)phosphate, di(isopropylphenyl)phenyl phosphate, monoisodecyl phosphate, 2-acryloyloxyethyl acid phosphate, 2-methacryloiloxy-ethyl acid phosphate, diphenyl-2-acryloyloxyethyl phosphate, diphenyl-2-methacryloiloxy-ethyl phosphate, melamine phosphate, dimelamine phosphate, melamine pyrophosphate, triphenyl phosphine oxide, tricresyl phosphine oxide and diphenyl methanephosphonate and diethyl phenylphosphonate.

Specific examples of the condensed phosphate include aromatic condensed phosphates such as resorcinol polyphenyl phosphate, 1,3-phenylenebis(2,6-dimethylphenyl phosphate), resorcinol poly(di-2,6-xylyl)phosphate, bisphenol A polycresyl phosphate, bisphenol A polyphenyl phosphate, hydroquinone poly(2,6-xylyl) phosphate, and a condensate thereof.

The molecular weight of these phosphorus-containing flame retardants is from 400 to 1,500, preferably from 500 to 1,000. When the molecular weight is adjusted in this range, volatilization during molding and bleeding-out of a molded article can be easily suppressed. A case where the molecular weight of the phosphorus-containing flame retardant is less than 400 is not preferred from viewpoints of volatility and bleeding-out. A case where the molecular weight of the phosphorus-containing flame retardant is larger than 1,500 is not preferred from a viewpoint of compatibility to a resin.

Moreover, the specific examples also include a polyphosphate including a salt of phosphoric acid or polyphosphate with a metal of Group 1 to Group 14 of the periodic table, ammonia, aliphatic amine or aromatic amine Specific examples of typical salts of polyphosphate include, as a metal salt, a lithium salt, a sodium salt, a calcium salt, a barium salt, an iron(II) salt, an iron(III) salt and an aluminum salt, as an aliphatic amine salt, a methylamine salt, an ethylamine salt, a diethylamine salt, a triethylamine salt, an ethylenediamine salt and a piperazine salt, and as aromatic amine salt, a pyridine salt and a triazine salt.

Moreover, the specific examples also include, in addition the above-described compounds, halogen-containing phosphate such as trischloroethyl phosphate, trisdichloropropyl phosphate and tris(beta-chloropropyl)phosphate, a phosphazene compound having a structure in which a phosphorus atom and a nitrogen atom are bonded by a double bond, and phosphoric ester amide.

These phosphorus-containing flame retardants may be used alone, or in combination of two or more thereof.

These phosphorus-containing flame retardants can be produced by a publicly known method. Moreover, a commercial item can also be used, and specific examples thereof include "CR-733S, CR-741 and PX-200 (all manufactured by DAIHACHI CHEMICAL INDUSTRY CO., LTD.)", and "FP-600 and FP-700" (all manufactured by ADEKA CORPORATION).

The content of the plasticizer and the phosphorus-containing flame retardant to be contained in the resin composition according to the present invention is not particularly limited, but an amount of addition of the plasticizer is preferably 3 to 20% by mass, and further preferably 5 to 15% by mass, based on the total solid of the resin composition. Moreover, an amount of addition of the phosphorus-containing flame retardant is preferably 3 to 25% by mass, and further preferably 5 to 20% by mass, based on the total solid of the resin composition. In addition, a total of content of the plasticizer and the phosphorus-containing flame retardant is preferably 10 to 40% by mass, and further preferably 15 to 30% by mass, based on the total solid of the resin composition. When the content is adjusted in this range, a balance between moldability and strength, impact resistance or flame retardancy of the molded article is easily achieved.

<Fluorine-Based Resin>

It is preferable that the resin composition of the present invention further contains a fluorine-based resin. The reason is that much higher flame retardancy is achieved by preventing dripping when the molded article burns.

The fluorine-based resin in the present invention refers to a resin containing fluorine in a substance molecule, and specific examples thereof include polytetrafluoroethylene, polyhexafluoropropylene, a tetrafluoroethylene/hexafluoropropylene copolymer, a tetrafluoroethylene/perfluoroalkyl vinyl ether copolymer, a tetrafluoroethylene/ethylene copolymer, a hexafluoropropylene/propylene copolymer, polyvinylidene fluoride and a vinylidene fluoride/ethylene copolymer. Among them, polytetrafluoroethylene, a tetrafluoroethylene/perfluoroalkyl vinyl ether copolymer, a tetrafluoroethylene/hexafluoropropylene copolymer, a tetrafluoroethylene/ethylene copolymer or polyvinylidene fluoride is preferably used. Polytetrafluoroethylene or a tetrafluoroethylene/ethylene copolymer is particularly preferably used, polytetrafluoroethylene is further preferably used, and polytetrafluoroethylene-containing mixed powder including polytetrafluoroethylene particles and an organic polymer is also preferably used. The molecular weight of the fluorine-based resins such as polytetrafluoroethylene is preferably in the range of 100,000 to 10,000,000, and particularly preferably, in the range of 100,000 to 1,000,000, which is particularly effective in extrusion moldability and flame retardancy. As a commercial item of polytetrafluoroethylene, "Teflon (registered trade name)" 6-J, "Teflon (registered trade name)" 6 C-J and "Teflon (registered trade name)" 62-J as manufactured by Du Pont-Mitsui Fluorochemicals Co., Ltd., "Fluon" CD1 and CD076 as manufactured by Asahi-ICI Fluoropolymers Co., Ltd., and so forth are commercially available. As a commercial item of the polytetrafluoroethylene-containing mixed powder including the polytetrafluoroethylene particles and the organic polymer, the item is commercially available as "METABLEN (registered trade name)" A series from Mitsubishi Rayon Co., Ltd., and "METABLEN (registered trade name)" A-3000, "METABLEN (registered trade name)" A-3800, and so forth are commercially available. Moreover, "Teflon (registered trade name)" 6-J being polytetrafluoroethylene and so forth are easily aggregated. Therefore, if mechanically strong mixing is made with any other resin composition by a Henschel mixer or the like, lumps may be occasionally produced, and thus problems are in handling properties or dispersibility depending on mixing conditions. On the one hand, the polytetrafluoroethylene-containing mixed powder including the polytetrafluoroethylene particles and the organic polymer is excellent in the above-described handling properties and dispersibility, and is particularly preferably used. The above-described polytetrafluoroethylene-containing mixed powder including the polytetrafluoroethylene particles and the organic polymer is not particularly limited, and specific examples thereof include polytetrafluoroethylene-containing mixed powder including polytetrafluoroethylene particles and an organic polymer as disclosed in JP-A-2000-226523 A. The above-described organic polymer includes an organic polymer containing 10% by weight or more of an aromatic vinyl monomer, an acrylate monomer, a vinyl cyanide monomer, or may be a mixture thereof, and the content of polytetrafluoroethylene in the polytetrafluoroethylene-containing mixed-powder is preferably 0.1% by mass to 90% by mass.

An amount of blending the fluorine-based resin in the resin composition according to the present invention is preferably 1 to 0.01% by mass, further preferably, 0.8 to 0.02% by mass, and still further preferably, 0.5 to 0.03% by mass. When the amount is adjusted in this range, flame retardancy can be further improved while suppressing an influence on moldability.

<Other Components>

The resin composition according to the present invention may contain a filler (reinforcement). When the resin composition contains the filler, mechanical characteristics of the molded article formed using the resin composition can be reinforced.

As the filler, a publicly known one can be used. A shape of the filler may be any of a fiber shape, a plate shape, a granule shape and a powder shape. Moreover, the filler may be an inorganic substance or an organic substance.

Specific examples of the inorganic fillers include a fiber-shaped inorganic filler such as a glass fiber, a carbon fiber, a graphite fiber, a metal fiber, a potassium titanate whisker, an aluminum borate whisker, a magnesium-based whisker, a silicon-based whisker, wollastnite, sepiolite, a slag fiber, zonolite, ellestadite, a gypsum fiber, a silica fiber, a silica alumina fiber, a zirconia fiber, a boron nitride fiber, a silicon nitride fiber and a boron fiber; and a plate-shaped or granule-shaped inorganic filler such as a glass flake, non-swelling isinglass, carbon black, graphite, a metal foil, a ceramic bead, talc, clay, mica, sericite, zeolite, bentonite, dolomite, kaolin, fine powder silicic acid, feldspar powder, potassium titanate, a shirasu balloon, calcium carbonate, magnesium carbonate, barium sulfate, calcium oxide, aluminum oxide, titanium oxide, magnesium oxide, aluminum silicate, silicon oxide, aluminum hydroxide, magnesium hydroxide, gypsum, novaculite, dawsonite and white clay.

Specific examples of the organic filler include a fiber-shaped organic filler obtained from a polyester fiber, a nylon fiber, an acryl fiber, a regenerated cellulosic fiber, a synthetic fiber such as an acetate fiber, a natural fiber such as kenaf, ramie, cotton, jute, hemp, sisal, abaca, flax, linen, silk and wool, microcrystal cellulose, a sugar cane, a wood pulp, paper scraps, and waste paper, and a granule-shaped organic filler such as an organic pigment.

When the resin composition contains the filler, the content thereof is not restrictive, but is preferably 30% by mass or less, and further preferably, 5 to 10% by mass, based on the total solid of the resin composition.

The resin composition according to the present invention may also contain, in addition to the above-described one, any other component for the purpose of improving various characteristics, such as moldability and flame retardancy within the range in which the purpose of the present invention is not adversely affected.

Specific examples of other components include a releasing agent (fatty acid, a fatty acid metallic salt, hydroxy fatty acid, fatty acid ester, partially saponified aliphatic ester, paraffin, low-molecular-weight polyolefin, fatty amide, alkylene bisfatty acid amide, aliphatic ketone, fatty acid lower-alcohol ester, fatty acid polyhydric-alcohol ester, fatty acid polyglycol ester and modified silicone), an antistatic agent, a flame retardant aid, a processing aid, an antibacterial agent and an antifungal agent. Further, a coloring agent including a dye and a pigment can also be added.

<Molded Article>

The molded article according to the present invention can be obtained by molding the resin composition according to the present invention.

The method of producing the molded article according to the present invention includes a step for heating and molding the resin composition according to the present invention.

Specific examples of the molding methods include injection molding, extrusion molding and blow molding. The resin composition according to the present invention is preferably a resin composition for injection molding.

The heating temperature is usually from 160 to 300° C., preferably from 180 to 260° C.

In the present invention, the above-described reaction of the glycidyl group-containing polymer compound and cellulose acetate is preferably progressed simultaneously with kneading and extrusion. On the occasion, a batch provided for kneading is preferably charged by, in addition to the above-described components, a stabilizer, a thermoplastic resin, a flame retardant and the like required therefor, and thus a molded article having desired performance is obtained. According to the present invention, while the decomposition temperature is enhanced by addition of a heat stabilizer as mentioned above, a softening temperature is adjusted to be in a direction of relatively becoming low by the reaction, and larger ΔT is provided. Therefore, width of a heating temperature during kneading and extrusion is extended, and setup of production conditions having a higher degree of freedom is allowed.

An application of the molded article according to the present invention is not particularly limited, and specific examples thereof include an interior or exterior part of electric/electronic equipment (a household appliance, OA- and media-related equipment, optical equipment and communication equipment), an automotive part, a machine part, and a housing and building material. Among the applications, from viewpoints of having excellent heat resistance and impact resistance, excellent resistance to plane impact, and a small load to an environment, the molded article can be favorably used as an exterior part (particularly housing) for electric/electronic equipment such as a copier, a printer, a personal computer, and a television, for example.

EXAMPLES

The present invention will be described in more detail based on examples given below, but the invention is not meant to be limited by these.

Example 1 and Comparative Example 1

Compatibilizer

A compatibilizer, in which a monomer unit polymerized in a mass ratio shown in Table 1, was prepared. Any compatibilizer other than a compatibilizer c1 is a glycidyl group-containing polymer compound. Moreover, a compatibilizer c2 is an acid anhydride and a compatibilizer c3 is talc. A detail was described down in the margin of Table 1.

Synthesis Example of Compatibilizer 3

Into a three-necked flask having a volume of 500 mL equipped a cooling tube, 1.56 g of V-601 manufactured by Wako Pure Chemical Industries, Ltd. as a radical polymerization initiator, 72 g of AAEMA as a vinyl monomer, 22 g of MAN, 6 g of GMA, and 50 g of MEK (methyl ethyl ketone) as a solvent were charged, polymerization was performed at 80° C. for 6 hours under a nitrogen atmosphere, and reprecipitation was performed in 2 L of hexane, and thus and a solid was obtained. The solid obtained was subjected to warm air drying, and vacuum drying at 100° C. for 6 hours, and then the resultant solid was used.

TABLE 1

| | | Soft vinyl component | | | Hard vinyl component | | | | | Reactive group: | Mass average molecular weight |
|---|---|---|---|---|---|---|---|---|---|---|---|---|
| | | DAC affinity: none | DAC affinity: present | | DAC affinity: none | | DAC affinity: present | | Hard | | (Mole fractions % - Total 100%) |
| | | PE | PMA | PAAEMA | PVA | AS | PSt | PAN | PMAN | PVP | PC | GMA | |
| Compatibilizer | 1 | 67 | 27 | | | | | | | | | 6 | 61,000 |
| | 2 | 83 | | | 5 | | | | | | | 12 | 64,000 |
| | 3 | | | 72 | | | | | 22 | | | 6 | 38,000 |
| | 4 | | | | | | | | 38 | 62 | | 6 | 45,000 |
| | 5 | | | | | 9 | 21 | | | | 59.5 | 10.5 | 12,000 |
| | 6 | | | 34 | | | | | 10.5 | | 45 | 10.5 | 11,000 |
| | 7 | 59.5 | | | | 30 | | | | | | 10.5 | 49,000 |
| | 8 | 30 | 14.5 | | | | | | | | 45 | 10.5 | 21,000 |
| | 9 | 94 | | | | | | | | | | 6 | 71,000 |
| | 10 | 49 | 27 | | | | | | | | | 24 | 57,000 |
| | c1 | 70 | 30 | | | | | | | | | 0 | 87,000 |
| | c2 | | | | | Acid anhydride | | | | | | | — |
| | c3 | | | | | Talc | | | | | | | — |
| | c4 | | | | | Phenylglycidyl ether | | | | | | | — |
| | c5 | | | | | Maleic anhydride | | | | | | | — |

Acid anhydride: BONDINE AX8390 manufactured by ARKEMA (PE: 69.7 wt %, EA: 29 wt %, MAH: 1.3 wt %)
Talc: MICRO ACE series P-6 manufactured by Nippon Talc Co., Ltd.
=> Blanks mean no blending. Only for explicitly showing for comparison, "0" is written.
PE: Ethylene component, EA: Ethyl acrylate component, MAH: Maleic anhydride component In Table 1, an abbreviation of each components represents the following one. The following one is written as a polymer (polymer compound: P-), and means being incorporated into a polymer chain as a residue. A term excluding P at the top of the following abbreviation represents a monomer.

GMA: Glycidyl methacrylate
PE: Polyethylene
PMA: Poly(methyl acrylate)
PAAEMA: Poly(acetoacetoxy)ethyl methacrylate
AS: Acrylonitrile/styrene copolymer
PAN: Polyacrylonitrile
PMAN: Polymethacrylonitrile
PSt: Polystyrene
PVA: Polyvinyl acetate
PVP: Polyvinyl pyrrolidone
PC: Polycarbonate resin "PANLITE L1225Y" (trade name, manufactured by Teijin Chemicals Ltd., having a bisphenol A skeleton, Mn=25,000)

(Preparation of a Molded Article)

Cellulose ester, a compatibilizer, a thermoplastic resin, a flame retardant, and any other component were mixed at a blending ratio (part by mass) shown in the following Table, and a resin composition was prepared. This resin composition was fed to a twin screw kneading extruder (Ultranano, manufactured by TECHNOVEL CORPORATION), and kneaded at a kneading temperature of 180 to 260° C., a screw speed (50 to 300 rpm), and a material supply amount (1 kg/h). A kneaded material was pelletized, and then the pellets obtained were fed to an injection molding machine (Roboshot S-2000i, a trade name, automatic injection molding machine, FANUC CORPORATION), and a multipurpose test specimen having a size of 4×10×80 mm was molded at a resin temperature of 190 to 260° C., at a resin residence time of 1 minute in a cylinder, at a die temperature of 40 to 60° C., and for a cooling time of 20 to 40 seconds.

In Tables 2-1 to 5-2, an abbreviation of each components represents the following one.
(CA: Cellulose Acetate)

TABLE A

| No. | Trade name | Manufacturer | Substitution degree* | Residual hydroxyl group substitution degree | Number average molecular weight |
|---|---|---|---|---|---|
| CA1 | L-70 | Daicel Corporation | A: 2.45 | 0.55 | 65,000 |
| CA2 | LM-80 | Daicel Corporation | A: 2.1 | 0.9 | 34,000 |
| CA3 | L-30 | Daicel Corporation | A: 2.45 | 0.55 | 42,000 |
| cCA1 | LL-10 | Daicel Corporation | A: 1.8 | 1.2 | 34,000 |
| cCA2 | LT-55 | Daicel Corporation | A: 2.85 | 0.15 | 70,000 |
| cCAP | CAP482-20 | Eastman Chemical Company | A: 0.1 P:2.5 | 0.4 | 73,000 |

*A—Acetyl substitution degree, P—propionyl substitution degree (Plasticizer)
Plasticizer 1: Diethyl phthalate
Plasticizer 2: Tripropionin
(Stabilizer)
Stabilizer 1 (hindered phenol-based): pentaerythrityl tetrakis [3-(3,5-di-t-butyl-4-hydroxyphenyl)propionate], "Irganox 1010" (trade name, manufactured by Ciba Japan)
Stabilizer 2 (phosphite-based): 3,9-bis(2,6-di-tert-butyl-4-methylphenoxy)-2,4,8,10-tetraoxa-3,9-diphosphaspiro[5,5]undecane, "ADKSTAB PEP-36" (trade name, manufactured by ADEKA Corporation)
(Thermoplastic Resin)
PC1: Polycarbonate, "PANLITE L1225Y" (Mw: 45,000, manufactured by Teijin Chemicals Ltd.)
PC2: Polycarbonate, "PANLITE L1225L" (Mw: 38,000, manufactured by Teijin Chemicals Ltd.)
PET: Polyethylene terephthalate
PBAT: Polybutylene adipate terephthalate, "ECOFLEX" (trade name, manufactured by BASF)
ELITEL: Thermoplastic saturated copolymerized polyester resin, "ELITEL UE-3203" (trade name, manufactured by UNITIKA LTD.)
VYLON: "VYLON GH230B" (trade name, manufactured by TOYOBO CO., LTD.)
Flame retardant 1: "PX-200" (trade name, manufactured by DAIHACHI CHEMICAL INDUSTRY CO., LTD.)
Flame retardant 2: Triphenyl phosphate

[Method of Measuring Number Average Molecular Weight]

For measurement of a number average molecular weight, Gel Permeation Chromatography (GPC) was applied. Specifically, the number average molecular weight was determined by using N-methylpyrrolidone as a solvent, and a polystyrene gel, and using an equivalent molecular-weight calibration curve predetermined from a calibration curve of standard monodisperse polystyrene. As a GPC apparatus, HLC-8220GPC (manufactured by TOSOH CORPORATION) was used.

[Evaluation]

The following items were evaluated using the resin composition and the multipurpose test specimen as obtained. The evaluation results are shown in Tables 2 to 5.

(ΔT)

A difference between the flowing temperature and the decomposition temperature was measured as follows.

A flow tester was used for determining an index of flowing temperature. A flow tester (CFT-100D, use of a die having L=10 mm and D=1.0 mm, manufactured by Shimadzu Corporation), powder or pellets were charged into a device at a temperature below a glass transition temperature, and temperature rise measurement was performed at a shear rate of $100 \text{ s}^{-1}$, and a heating rate of 2° C./min. Temperature at which injection molding is generally easily allowed and apparent viscosity in this measurement becomes 100 Pa·s was described as a flow characteristic temperature. As an index of decomposition temperature, mass loss temperature at which a loss of 2% by mass is caused in air was used. As weight loss temperature at which a loss of 2% by mass is caused in air, a thermogravimetry/differential thermal analyzer (TG/DTA) manufactured by SII NanoTechnology Inc. was used, and measurement was carried out under dry air using 5 mg of sample at a heating temperature of 10° C./min. from 30° C. to 500° C., and temperature at which a mass decreased by 2% by mass was described as the weight loss temperature. A difference in temperatures as determined by the above-described two methods was defined as ΔT.

AA: ΔT was 40° C. or more.
A: ΔT was 30° C. or more and less than 40° C.
B: ΔT was 20° C. or more and less than 30° C.
C: ΔT was less than 20° C.

(Flexural Modulus)

In accordance with ISO178, a test specimen molded by injection molding was conditioned at 23° C.±2° C. and 50%±5% RH for 48 hours or more, and a flexural modulus was measured at a span of 64 mm and a test speed of 2 mm/min using Instron (STROGRAPH V50, manufactured by Toyo Seiki Seisaku-Sho, Ltd.). Measurement was carried out three times and a mean value was described.

(Flame Retardancy)

As an index of flame retardancy, a vertical burning test in accordance with UL94 was conducted. The number of tests was five. One that was not self-extinguished was described as V-not, one that had drips of a resin composition and was self-extinguished within a predetermined period of time during a burning test was described as V-2, one that had no drips and was self-extinguished within a predetermined period of time was described as V-1 (within 30 seconds in the burning time), and V-0 (within 10 seconds in the burning time).
(Volatility)

Upon kneading and molding processing of a resin composition, a volatile component was visually confirmed by white smoke or the like. A case where no volatile component was notified was rated to be A, a case where white smoke was slightly notified as rated to be B, and a case where white smoke was clearly observed was rated to be C.
(Heat Deflection Temperature: Flow Start Temperature)

In accordance with ISO75, a predetermined bending load (1.8 MPa) was placed on a center of a test specimen (flatwise direction), the temperature was raised at a uniform rate, and temperature (° C.) at which deflection at the center reached 0.34 mm was measured, and described as the heat deflection temperature.
(Impact Strength)

In accordance with ISO179, a notch having an incident angle of 45±0.5 degrees and a tip of 0.25±0.05 mm was formed to a test specimen molded by injection molding, and the test specimen was allowed to stand at 23° C.±2° C. and 50%±5% RH for 48 hours or more, and impact strength was measured edgewise using a Charpy impact tester (manufactured by Toyo Seiki Seisaku-Sho, Ltd.).
(Plane Impact Level)

As an index of plane impact resistance, a steel ball drop test was applied. A 500 g steel ball was dropped from a predetermined height of 200 mm or more onto a 1.5 mm-thick molded piece fixed with a tool being 60 mm×60 mm in an inner frame, and height without resulting in break was described as a height of plane impact resistance.
(Total Evaluation)

In consideration of the results of evaluation of each of the above-described items, the results were classified as follows based on a requirement satisfaction on the presumption of utilization to a housing of precision instrument.

AA: In a level of satisfying the requirement level to obtain a high evaluation.
A: In a level of satisfying the requirement level.
B: In a level of sufficiently satisfying the requirement if use conditions and so forth are limited.
C: In a level of no satisfying the requirement level.

TABLE 2-1

| Test No. | | 101 | 102 | 103 | 104 | 105 | 106 | 107 | 108 | 109 | (Parts by mass) 110 |
|---|---|---|---|---|---|---|---|---|---|---|---|
| Cellulose acetate* | CA1 (0.55) | 97 | 95 | 90 | 90 | 80 | 70 | 50 | 87 | 87 | |
| | CA2 (0.9) | | | | | | | | | | 80 |
| Compatibilizer | 1 | 3 | 5 | 10 | 10 | 20 | 30 | 50 | 10 | 10 | 20 |
| Plasticizer | 1 | 1 | | | | | | | 3 | | |
| | 2 | | | | | | | | | 3 | |
| Stabilizer | 1 | 0.1 | 0.1 | 0.1 | 0.2 | 0.1 | 0.1 | 0.1 | 0.1 | 0.1 | 0.1 |
| | 2 | 0.1 | 0.1 | 0.1 | | 0.1 | 0.1 | 0.1 | 0.1 | 0.1 | 0.1 |
| Compatibilizer substitution degree | | 0.01 | 0.02 | 0.04 | 0.04 | 0.07 | 0.10 | 0.14 | 0.03 | 0.04 | 0.05 |
| ΔT (° C.) | | A: 35 | AA: 42 | AA: 45 | A: 30 | AA: 50 | AA: 58 | AA: 63 | AA: 48 | AA: 47 | AA: 53 |
| Volatility | | A | A | A | A | A | A | A | B | B | A |
| Flexural modulus (GPa) | | 4.4 | 4.1 | 3.5 | 3.6 | 2.3 | 1.1 | 0.6 | 3.3 | 3.2 | 2.5 |
| Heat deflection temperature (° C.), 1.8 MPa | | 166 | 152 | 140 | 137 | 110 | 85 | 53 | 127 | 125 | 114 |
| Impact strength (kJ/m$^2$) | | 3.9 | 4.1 | 5.2 | 5.8 | 8.3 | 11 | >25 | 6.5 | 7.3 | 7.7 |
| Plane impact level (mm) | | B: 400 | B: 600 | A: 800 | B: 600 | AA: 1,000 | AA: 1,300 | AA: 1,000 | A: 800 | A: 800 | AA: 1,000 |
| Total evaluation | | B | B | A | B | AA | AA | AA | B | B | AA |

*A figure in a parenthesis represents a residual hydroxyl group substitution degree.

TABLE 2-2

| Test No. | | c101 | c102 | c103 | c104 | c105 | (Parts by mass) c106 |
|---|---|---|---|---|---|---|---|
| Cellulose acetate* | CA1 (0.55) | 90 | | | 100 | 80 | 80 |
| | cCA1 (1.2) | | 80 | | | | |
| | cCA2 (0.15) | | | 80 | | | |
| | cCAP (0.4) | | | | | | |
| Compatibilizer | 1 | 10 | 20 | 20 | 0 | | |
| | c1 | | | | | | |
| | c2 | | | | | | |
| | c3 | | | | | 20 | |
| | c4 | | | | | | 20 |
| | c5 | | | | | | |
| Plasticizer | 1 | | | | | | |
| | 2 | | | | | | |
| Stabilizer | 1 | 0 | 0.1 | 0.1 | 0.1 | 0.1 | 0.1 |
| | 2 | 0 | 0.1 | 0.1 | 0.1 | 0.1 | 0.1 |
| Compatibilizer substitution degree | | 0.04 | 0.04 | 0.01 | 0 | Non-measurable[3] | 0 |
| ΔT (° C.) | | C: 10 | B: 22 | C: 15 | Non-kneadable[2] | Decomposition of material during kneading | Non-kneadable[2] |
| Volatility | | C | C | C | | | |
| Flexural modulus (GPa) | | Non-moldable[1] | Non-moldable[1] | Non-moldable[1] | | | |
| Heat deflection temperature (° C.), 1.8 MPa | | | | | | | |
| Impact strength (kJ/m$^2$) | | | | | | | |
| Plane impact level (mm) | | | | | | | |
| Total evaluation | | C | C | C | C | C | C |

TABLE 2-2-continued

| Test No. | | c107 | c108 | c109 | c110 | c111 | c112 |
|---|---|---|---|---|---|---|---|
| Cellulose acetate* | CA1 (0.55) | 80 | 80 | 80 | 80 | | 65 |
| | cCA1 (1.2) | | | | | | |
| | cCA2 (0.15) | | | | | | |
| | cCAP (0.4) | | | | | 80 | |
| Compatibilizer | 1 | 0 | 0 | 0 | | 20 | |
| | c1 | | | | 20 | | |
| | c2 | | | | | | |
| | c3 | | | | | | |
| | c4 | | | | | | 20 |
| | c5 | | | | | | 5 |
| Plasticizer | 1 | 20 | | 10 | | | 10 |
| | 2 | | 20 | 10 | | | |
| Stabilizer | 1 | 0.1 | 0.1 | 0.1 | 0.1 | 0.1 | 0.1 |
| | 2 | 0.1 | 0.1 | 0.1 | 0.1 | 0.1 | 0.1 |
| Compatibilizer substitution degree | | 0 | 0 | 0 | 0 | <0.01 | 0.11 |
| ΔT (° C.) | | B: 22 | C: 17 | B: 24 | C: 9 | AA: 49 | C: 8 |
| Volatility | | C | C | C | A | A | C |
| Flexural modulus (GPa) | | 2.6 | 2.8 | 2.7 | 2.1 | 0.6 | 1.1 |
| Heat deflection temperature (° C.), 1.8 MPa | | 74 | 75 | 75 | 102 | 49 | 63 |
| Impact strength (kJ/m$^2$) | | 15 | 17 | 14 | 4.7 | 10 | 3.9 |
| Plane impact level (mm) | | C: <200 | C: <200 | C: <200 | C: <200 | C: <200 | C: <200 |
| Total evaluation | | C | C | C | C | C | C |

X·The results of the material having a significantly decreased molecular weight by partial decomposition.
*A figure in a parenthesis represents a residual hydroxyl group substitution degree.
[1])Molding could not be conducted.
[2])Kneading could not be conducted.
[3])Measurement could not be conducted.

TABLE 3

| | | | | | | | | | | (Parts by mass) |
|---|---|---|---|---|---|---|---|---|---|---|
| Test No. | | 201 | 202 | 203 | 204 | 205 | 206 | 207 | 208 | 209 |
| Cellulose acetate* | CA1 (0.55) | 80 | 80 | 80 | 80 | 80 | 80 | 80 | 80 | 80 |
| Compatibilizer | 2 | 20 | | | | | | | | |
| | 3 | | 20 | | | | | | | |
| | 4 | | | 20 | | | | | | |
| | 5 | | | | 20 | | | | | |
| | 6 | | | | | 20 | | | | |
| | 7 | | | | | | 20 | | | |
| | 8 | | | | | | | 20 | | |
| | 9 | | | | | | | | 20 | |
| | 10 | | | | | | | | | 20 |
| Stabilizer | 1 | 0.1 | 0.1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 | 0.1 | 0.1 |
| Compatibilizer substitution degree | | 0.11 | 0.08 | 0.04 | 0.07 | 0.06 | 0.07 | 0.07 | 0.02 | 0.15 |
| ΔT (° C.) | | AA: 48 | AA: 44 | A: 39 | AA: 42 | AA: 45 | AA: 47 | AA: 49 | B: 24 | AA: 45 |
| Volatility | | A | A | A | A | A | A | A | A | A |
| Flexural modulus (GPa) | | 2.3 | 2.2 | 2.4 | 2.7 | 2.1 | 2.2 | 2.3 | 2.4 | 1.7 |
| Heat deflection temperature (° C.), 1.8 MPa | | 110 | 108 | 109 | 118 | 115 | 106 | 111 | 106 | 98 |
| Impact strength (kJ/m$^2$) | | 9.4 | 8.8 | 4.4 | 6.3 | 8.8 | 5.1 | 6.9 | 6.4 | 9.9 |
| Plane impact level (mm) | | AA: 1,300 | AA: 1,000 | B: 600 | B: 600 | A: 800 | B: 600 | AA: 1,000 | AA: 1,300 | AA: 1,000 |
| Total evaluation | | AA | AA | B | B | A | B | AA | B | AA |

*A figure in a parenthesis represents a residual hydroxyl group substitution degree.

TABLE 4-1

| | | | | | | | | (Parts by mass) | |
|---|---|---|---|---|---|---|---|---|---|
| Test No. | | 301 | 302 | 303 | 304 | 305 | 306 | 307 | 308 |
| Cellulose acetate* | CA1 (0.55) | 20 | 30 | 40 | 45 | 45 | 50 | 60 | 70 |
| | CA3 (0.55) | | | | | | | | |
| Thermoplastic resin | PC1 | 70 | 60 | 50 | 45 | 35 | 40 | 30 | 20 |
| Compatibilizer | 1 | | | | | | | | |
| | 8 | 10 | 10 | 10 | 10 | 20 | 10 | 10 | 10 |
| | 6 | | | | | | | | |
| Stabilizer | 1 | 0.1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 | 0.1 |
| Compatibilizer substitution degree | | 0.1 | 0.08 | 0.07 | 0.07 | 0.1 | 0.06 | 0.05 | 0.04 |
| ΔT (° C.) | | AA: 46 | AA: 47 | AA: 46 | AA: 45 | AA: 47 | AA: 47 | AA: 48 | AA: 45 |
| Volatility | | A | A | A | A | A | A | A | A |

TABLE 4-1-continued

| | | | | | | | | |
|---|---|---|---|---|---|---|---|---|
| Flexural modulus (GPa) | 2.3 | 2.3 | 2.5 | 2.6 | 2.1 | 2.7 | 2.6 | 2.8 |
| Heat deflection temperature (° C.), 1.8 MPa | 109 | 107 | 111 | 112 | 104 | 112 | 108 | 106 |
| Impact strength (kJ/m$^2$) | >25 | 22 | 18 | 11 | 11 | 8.3 | 5.5 | 5.1 |
| Plane impact level (mm) | AA: 1,600 | AA: 1,600 | AA: 1,300 | AA: 1,300 | AA: 1,000 | AA: 1,000 | A: 800 | A: 800 |
| Total evaluation | AA | AA | AA | AA | AA | AA | A | A |

| Test No. | | 309 | 310 | 311 | 312 | 313 | 314 | 315 |
|---|---|---|---|---|---|---|---|---|
| Cellulose acetate* | CA1 (0.55) | | | 40 | 40 | 40 | 40 | 40 |
| | CA3 (0.55) | 45 | 50 | | | | | |
| Thermoplastic resin | PC1 | 45 | 40 | 40 | 30 | 45 | 40 | 40 |
| Compatibilizer | 1 | | | | | | 20 | |
| | 8 | 10 | 10 | 20 | 30 | 15 | | |
| | 6 | | | | | | | 20 |
| Stabilizer | 1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 |
| Compatibilizer substitution degree | | 0.07 | 0.07 | 0.09 | 0.11 | 0.09 | 0.08 | 0.09 |
| ΔT (° C.) | | AA: 41 | AA: 42 | AA: 46 | AA: 49 | AA: 49 | A: 45 | AA: 46 |
| Volatility | | A | A | A | A | A | A | A |
| Flexural modulus (GPa) | | 2.5 | 2.6 | 2.3 | 1.8 | 2.4 | 2.3 | 2.3 |
| Heat deflection temperature (° C.), 1.8 MPa | | 107 | 103 | 113 | 91 | 111 | 110 | 116 |
| Impact strength (kJ/m$^2$) | | 7.7 | 5.5 | 12 | 20 | 10 | 9.5 | 9.2 |
| Plane impact level (mm) | | AA: 1,000 | AA: 1,000 | AA: 1,300 | AA: 1,600 | AA: 1,300 | B: 400 | AA: 1,300 |
| Total evaluation | | AA | AA | AA | AA | AA | B | AA |

*A figure in a parenthesis represents a residual hydroxyl group substitution degree.

TABLE 4-2

| | | | | | | | (Parts by mass) | |
|---|---|---|---|---|---|---|---|---|
| Test No. | | 401 | 402 | 403 | 404 | 405 | 406 | 407 |
| Cellulose acetate* | CA1 (0.55) | 40 | 40 | 40 | 40 | 40 | 40 | 40 |
| | cCAP (0.4) | | | | | | | |
| Thermoplastic resin | PC1 | | | | | | | |
| | PC2 | 40 | | | | | | |
| | PET | | 40 | | | | | |
| | PBAT | | | 40 | | | | |
| | ELITEL | | | | 40 | | | |
| | VYLON | | | | | 40 | | |
| | PE | | | | | | 40 | |
| | PSt | | | | | | | 40 |
| Compatibilizer | 1 | | | | | | 20 | |
| | 8 | 20 | 20 | 20 | 20 | 20 | | 20 |
| | c3 | | | | | | | |
| Stabilizer | 1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 |
| Compatibilizer substitution degree | | 0.09 | 0.09 | 0.09 | 0.09 | 0.09 | 0.09 | 0.09 |
| ΔT (° C.) | | AA: 49 | AA: 49 | AA: 48 | AA: 48 | AA: 46 | AA: 41 | AA: 50 |
| Volatility | | A | A | A | A | A | A | A |
| Flexural modulus (GPa) | | 2.4 | 1.9 | 1.4 | 1.3 | 1.3 | 1.4 | 2.2 |
| Heat deflection temperature (° C.), 1.8 MPa | | 81 | 94 | 81 | 78 | 74 | 63 | 76 |
| Impact strength (kJ/m$^2$) | | 8.6 | 10 | 10 | 14 | 10 | 5.9 | 2.2 |
| Plane impact level (mm) | | A: 800 | AA: 1,000 | AA: 1,000 | AA: 1,000 | AA: 1,000 | AA: 1,000 | B: 600 |
| Total evaluation | | A | AA | AA | AA | AA | AA | B |

| Test No. | | c201 | c202 | c203 |
|---|---|---|---|---|
| Cellulose acetate* | CA1 (0.55) | 45 | 20 | |
| | cCAP (0.4) | | | 50 |
| Thermoplastic resin | PC1 | 50 | 75 | 45 |
| | PC2 | | | |
| | PET | | | |
| | PBAT | | | |
| | ELITEL | | | |
| | VYLON | | | |
| | PE | | | |
| | PSt | | | |
| Compatibilizer | 1 | | | |
| | 8 | | | |
| | c3 | 5 | 5 | 5 |
| Stabilizer | 1 | 0.1 | 0.1 | 0.1 |
| | 2 | 0.1 | 0.1 | 0.1 |
| Compatibilizer substitution degree | | Non-measurable[1]) | — | — |
| ΔT (° C.) | | Non-kneadable[2]) | B: 24 | B: 23 |

TABLE 4-2-continued

| | | | | |
|---|---|---|---|---|
| Volatility | | | A | A |
| Flexural modulus (GPa) | | | 2.7 | 2.4 |
| Heat deflection temperature (° C.), 1.8 MPa | | | 117 | 91 |
| Impact strength (kJ/m$^2$) | | | 7.1 | 19 |
| Plane impact level (mm) | | | C: <200 | C: <200 |
| Total evaluation | | C | C | C |

*A figure in a parenthesis represents a residual hydroxyl group substitution degree.
[1)]Measurement could not be conducted.
[2)]Kneading could not be conducted.

TABLE 5-1

(Parts by mass)

| Test No. | | 501 | 502 | 503 | 504 | 505 | 506 | 507 |
|---|---|---|---|---|---|---|---|---|
| Cellulose acetate* | CA1 (0.55) | 45 | 5 | 10 | 30 | 40 | 45 | 45 |
| | CA3 (0.55) | | | | | | | |
| Thermoplastic resin | PC1 | 45 | 80 | 75 | 55 | 45 | 40 | 35 |
| | PC2 | | | | | | | |
| Compatibilizer | 8 | 10 | 10 | 10 | 10 | 10 | 10 | 10 |
| Plasticizer | 1 | | | | | | | |
| | 2 | | | | | | | |
| Stabilizer | 1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 |
| Flame retardant | 1 | | 5 | 5 | 5 | 5 | 5 | 10 |
| | 2 | | | | | | | |
| Fluoro resin | | | 0.3 | 0.3 | 0.3 | 0.3 | 0.3 | 0.3 |
| Compatibilizer substitution degree | | 0.07 | 0.11 | 0.1 | 0.08 | 0.07 | 0.07 | 0.07 |
| ΔT (° C.) | | AA: 45 | AA: 45 | AA: 46 | AA: 46 | AA: 47 | AA: 46 | AA: 46 |
| Volatility | | A | A | A | A | A | A | A |
| Flame retardancy | | HB | V-1 | V-1 | V-2 | V-2 | V-2 | V-0 |
| Matrix (sea) | | PC | PC | PC | PC | PC | PC | PC |
| Flexural modulus (GPa) | | 2.6 | 2.4 | 2.3 | 2.3 | 2.4 | 2.3 | 2.3 |
| Heat deflection temperature (° C.), 1.8 MPa | | 112 | 110 | 109 | 108 | 110 | 108 | 104 |
| Impact strength (kJ/m$^2$) | | 11 | 22 | 19 | 13 | 10 | 10 | 8.8 |
| Plane impact level (mm) | | AA: 1,300 | AA: >2,000 | AA: >2,000 | AA: 1,600 | AA: 1,300 | AA: 1,300 | AA: 1,000 |
| Total evaluation | | AA | AA | AA | AA | AA | AA | AA |

| Test No. | | 508 | 509 | 510 | 511 | 512 | 513 | 514 |
|---|---|---|---|---|---|---|---|---|
| Cellulose acetate* | CA1 (0.55) | | | 45 | 45 | 45 | 50 | 60 |
| | CA3 (0.55) | 45 | 45 | | | | | |
| Thermoplastic resin | PC1 | 35 | | 35 | 35 | 30 | 25 | 15 |
| | PC2 | | 35 | | | | | |
| Compatibilizer | 8 | 10 | 10 | 10 | 10 | 10 | 10 | 10 |
| Plasticizer | 1 | | | | | | | |
| | 2 | | | | | | | |
| Stabilizer | 1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 |
| Flame retardant | 1 | 10 | 10 | 10 | | 15 | 15 | 15 |
| | 2 | | | | 10 | | | |
| Fluoro resin | | 0.3 | 0.3 | | 0.3 | 0.3 | 0.3 | 0.3 |
| Compatibilizer substitution degree | | 0.07 | 0.07 | 0.07 | 0.07 | 0.07 | 0.06 | 0.05 |
| ΔT (° C.) | | AA: 43 | AA: 44 | AA: 47 | AA: 48 | AA: 45 | AA: 50 | AA: 48 |
| Volatility | | A | A | A | B | A | A | A |
| Flame retardancy | | V-2 | V-0 | V-2 | V-0 | V-2 | V-2 | V-2 |
| Matrix (sea) | | DAC | PC | PC | PC | DAC | DAC | DAC |
| Flexural modulus (GPa) | | 2.2 | 2.3 | 2.3 | 2.8 | 2.4 | 2.5 | 2.6 |
| Heat deflection temperature (° C.), 1.8 MPa | | 105 | 103 | 105 | 75 | 106 | 112 | 113 |
| Impact strength (kJ/m$^2$) | | 6.9 | 7.1 | 8.8 | 10 | 10 | 9.5 | 9.1 |
| Plane impact level (mm) | | B: 600 | B: 600 | AA: 1,000 | AA: 1,000 | A: 800 | A: 800 | B: 600 |
| Total evaluation | | B | B | AA | AA | A | A | B |

*A figure in a parenthesis represents a residual hydroxyl group substitution degree.

TABLE 5-2

(Parts by mass)

| Test No. | | 601 | 602 | 603 | 604 | 605 | 606 | 607 | 608 | 609 | 610 |
|---|---|---|---|---|---|---|---|---|---|---|---|
| Cellulose acetate* | CA1 (0.55) | 40 | 45 | 45 | 45 | 45 | 45 | 45 | 42 | 42 | 45 |
| Thermoplastic resin | PC1 | 35 | 35 | 35 | 35 | 35 | 35 | | 35 | 35 | |
| | PET | | | | | | | 35 | | | |

TABLE 5-2-continued

| | | | | | | | | | | | |
|---|---|---|---|---|---|---|---|---|---|---|---|
| Compatibilizer | PE 1 | | | 10 | | | | | | | 35 |
| | 3 | | | | 10 | | | | | | |
| | 4 | | | | | 10 | | | | | |
| | 5 | | | 10 | | | | | | | |
| | 7 | | 10 | | | | | | | | |
| | 8 | 15 | | | | | | | 10 | 10 | 10 | 10 |
| Plasticizer | 1 | | | | | | | | | 3 | |
| | 2 | | | | | | | | | | 3 |
| Stabilizer | 1 | 0.1 | 0.1 | 0.1 | 0.1 | 0.1 | 0.1 | 0.1 | 0.1 | 0.1 | 0.1 |
| | 2 | 0.1 | 0.1 | 0.1 | 0.1 | 0.1 | 0.1 | 0.1 | 0.1 | 0.1 | 0.1 |
| Flame retardant | 1 | 10 | 10 | 10 | 10 | 10 | 10 | 10 | 10 | 10 | 10 |
| Fluoro resin | | 0.3 | 0.3 | 0.3 | 0.3 | 0.3 | 0.3 | 0.3 | 0.3 | 0.3 | 0.3 |
| Compatibilizer substitution degree | | 0.06 | 0.07 | 0.07 | 0.05 | 0.04 | 0.05 | 0.07 | 0.06 | 0.06 | 0.07 |
| ΔT (° C.) | | AA: 49 | AA: 47 | AA: 48 | AA: 48 | AA: 45 | AA: 47 | AA: 46 | AA: 48 | AA: 49 | AA: 45 |
| Volatility | | A | A | A | A | A | A | A | B | B | A |
| Flame retardancy | | V-2 | V-1 | V-0 | V-2 | V-2 | V-2 | V-2 | V-2 | V-1 | V-not |
| Matrix (sea) | | DAC | PC | PC | DAC | DAC | DAC | DAC | PC | PC | DAC |
| Flexural modulus (GPa) | | 1.9 | 2.0 | 2.2 | 2.5 | 2.5 | 2.4 | 2.7 | 2.4 | 2.6 | 2.1 |
| Heat deflection temperature (° C.), 1.8 MPa | | 99 | 103 | 107 | 103 | 107 | 102 | 89 | 94 | 96 | 67 |
| Impact strength (kJ/m$^2$) | | 16 | 10 | 13 | 9.4 | 10 | 10 | 8.8 | 13 | 12 | 1.5 |
| Plane impact level (mm) | | AA: 1,000 | B: 600 | AA: 1,000 | B: 600 | B: 600 | B: 400 | B: 400 | A: 800 | A: 800 | B: 600 |
| Total evaluation | | AA | B | AA | B | B | B | B | A | A | B |

| Test No. | | c301 | c302 | c303 | c304 |
|---|---|---|---|---|---|
| Cellulose acetate* | CA1 (0.55) | 45 | 45 | 45 | 45 |
| Thermoplastic resin | PC1 | 40 | 35 | 35 | 35 |
| | PET | | | | |
| | PE | | | | |
| Compatibilizer | 1 | 0 | 0 | 0 | 0 |
| | 3 | | | | |
| | 4 | | | | |
| | 5 | | | | |
| | 7 | | | | |
| | 8 | | | | |
| Plasticizer | 1 | 10 | 10 | | 5 |
| | 2 | | | 10 | 5 |
| Stabilizer | 1 | 0.1 | 0.1 | 0.1 | 0.1 |
| | 2 | 0.1 | 0.1 | 0.1 | 0.1 |
| Flame retardant | 1 | 5 | 10 | 10 | 10 |
| Fluoro resin | | 0.3 | 0.3 | 0.3 | 0.3 |
| Compatibilizer substitution degree | | 0 | 0 | 0 | 0 |
| ΔT (° C.) | | AA: 47 | AA: 48 | AA: 41 | AA: 43 |
| Volatility | | C | C | C | B |
| Flame retardancy | | V-not | V-not | HB | V-not |
| Matrix (sea) | | PC | DAC | PC | DAC |
| Flexural modulus (GPa) | | 3.1 | 3.1 | 2.9 | 2.9 |
| Heat deflection temperature (° C.), 1.8 MPa | | 93 | 89 | 76 | 83 |
| Impact strength (kJ/m$^2$) | | 15 | 2.2 | 10 | 2.9 |
| Plane impact level (mm) | | C: <200 | C: <200 | C: <200 | C: <200 |
| Total evaluation | | C | C | C | C |

*A figure in a parenthesis represents a residual hydroxyl group substitution degree.

The term "matrix (sea)" means a state, in which the resin has a continuous phase in the test specimen.

The results described above show that, according to the present invention, the volatility caused by the low-molecular-weight plasticizer or the like during production were prevented by using cellulose acetate being the biomass material, and the resin composition having excellent moldability could be provided. Further, according to the present invention, the cellulose acetate ether compound-containing resin composition and the molded article thereof could be provided.

Having described our invention as related to the present embodiments, it is our intention that the invention not be limited by any of the details of the description, unless otherwise specified, but rather be construed broadly within its spirit and scope as set out in the accompanying claims.

The invention claimed is:

1. A cellulose acetate resin composition comprising a cellulose acetate ether compound, a stabilizer and at least one thermoplastic resin;

the cellulose acetate ether compound comprising a specific atomic group represented by formula (1-1) or (1-2), the specific atomic group being introduced into a cellulose acetate through an ether group derived from a hydroxyl group, the specific atomic group being introduced with a substitution degree of 0.01 to 0.20; the cellulose acetate comprising residual hydroxyl group in a substitution degree of 0.3 to 1.0, the stabilizer being at least one selected from the group consisting of a phosphite compound, a hindered phenol compound, a hindered amine compound, and a sulfur compound;

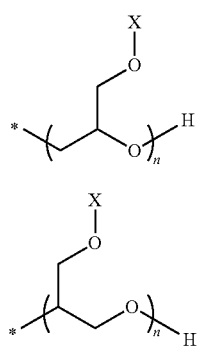

(1-1)

(1-2)

wherein, in formula (1-1) or (1-2), * represents a position to be bonded with the ether group derived from the hydroxyl group of the cellulose acetate; x represents a monovalent polymer compound residue; and n is 1 or 2.

2. The resin composition according to claim 1, wherein the specific atomic group represented by formula (1-1) or (1-2) has a substitution degree of 0.05 to 0.20.

3. The resin composition according to claim 1, wherein X in formulas (1-1) and (1-2) contains at least one vinyl monomer unit represented by formula (2):

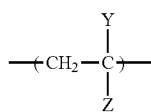

(2)

wherein Y represents a hydrogen atom or an alkyl group having 1 to 3 carbon atoms; and Z represents a hydrogen atom, an alkyl group, an alkoxycarbonyl group, a cyano group, a carboxyl group, an acyl group, an acyloxy group, an acylamino group, a carbamoyl group, an aminocarbonyl group, or an aromatic group.

4. The resin composition according to claim 3, wherein Y in formula (2) is a group selected from a hydrogen atom and a methyl group; and Z is a group selected from the group consisting of a hydrogen atom, a methyl group, a methoxycarbonyl group, an ethyl acetoacetate oxycarbonyl group, an acetyloxy group, a phenyl group, a cyano group and a pyrrolidonyl group.

5. The resin composition according to claim 4, wherein Y in formula (2) is a group selected from a hydrogen atom and a methyl group; and Z is a group selected from the group consisting of a hydrogen atom, a cyano group, an ethyl acetoacetate oxycarbonyl group, and a methoxycarbonyl group.

6. The resin composition according to claim 1, wherein polymer compound residues in formulas (1-1) and (1-2) contain a component of the thermoplastic resin as a repeating unit.

7. The resin composition according to claim 1, wherein the thermoplastic resin is an aromatic polycarbonate resin, and an aromatic polycarbonate skeleton represented by formula (3) is contained in part of the polymer compound residues in formulas (1-1) and (1-2),

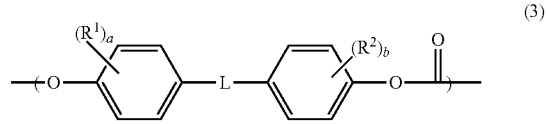

(3)

wherein $R^1$ and $R^2$ are each independently a halogen atom or a hydrocarbon group having 1 to 12 carbon atoms; a and b are each independently an integer of 0 to 4; when a or b is 2 or more, a plurality of $R^1$s and $R^2$s may be the same or different from each other; L represents a linking group selected from —O—, —S—,

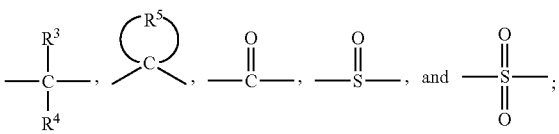

$R^3$ and $R^4$ each independently represent a hydrogen atom, a halogen atom or a hydrocarbon group having 1 to 12 carbon atoms; and $R^5$ represents an atomic group required for forming a cyclic hydrocarbon group having 6 to 15 carbon atoms.

8. The resin composition according to claim 1, wherein the thermoplastic resin forms a continuous phase and the cellulose acetate ether compound forms a dispersed phase.

9. The resin composition according to claim 1, wherein the stabilizer is a stabilizer of a phosphite compound or a hindered phenol compound.

10. The resin composition according to claim 1, containing at least one phosphorus compound flame retardant.

11. The resin composition according to claim 1, containing a fluorine-based resin.

12. The resin composition according to claim 1, wherein the cellulose acetate ether compound is a reaction product of a cellulose acetate having a residual hydroxyl group substitution degree of 0.3 to 1.0 and a polymer compound having a repeating unit represented by formula (1a):

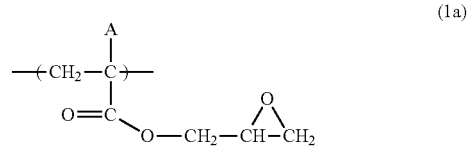

(1a)

wherein A represents a hydrogen atom or a methyl group.

13. The resin composition according to claim 1, wherein the cellulose acetate ether compound is contained in a mass ratio of 10% or more and less than 50%, based on the total mass of the resin composition.

14. A method of producing the resin composition according to claim 1, the method comprising the step of:

allowing a cellulose acetate having a residual hydroxyl group in a substitution degree of 0.3 to 1.0 to react with a polymer compound having a repeating unit represented by formula (1a):

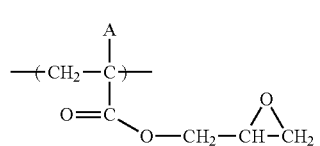
(1a)
wherein A represents a hydrogen atom or a methyl group.
15. A molded article formed of the cellulose acetate resin composition according to claim 1.